(12) United States Patent
Gong et al.

(10) Patent No.: US 12,475,163 B2
(45) Date of Patent: Nov. 18, 2025

(54) METHOD AND SYSTEM FOR A TEXT-VISION RETRIEVAL FRAMEWORK

(71) Applicant: Dell Products L.P., Round Rock, TX (US)

(72) Inventors: Min Gong, Shanghai (CN); Qi Bao, Acton, MA (US); Zijia Wang, London (GB)

(73) Assignee: DELL PRODUCTS L.P., Round Rock, TX (US)

( * ) Notice: Subject to any disclaimer, the term of this patent is extended or adjusted under 35 U.S.C. 154(b) by 86 days.

(21) Appl. No.: 18/615,042

(22) Filed: Mar. 25, 2024

(65) Prior Publication Data

US 2025/0298840 A1    Sep. 25, 2025

(51) Int. Cl.
| | | |
|---|---|---|
| *G06F 16/53* | (2019.01) | |
| *G06F 16/532* | (2019.01) | |
| *G06F 16/535* | (2019.01) | |
| *G06F 16/538* | (2019.01) | |
| *G06F 16/56* | (2019.01) | |

(52) U.S. Cl.
CPC .......... *G06F 16/535* (2019.01); *G06F 16/532* (2019.01); *G06F 16/538* (2019.01); *G06F 16/56* (2019.01)

(58) Field of Classification Search
CPC .... G06F 16/535; G06F 16/538; G06F 16/532; G06F 16/56
USPC .......................................................... 707/722
See application file for complete search history.

(56) References Cited

U.S. PATENT DOCUMENTS

| | | | | |
|---|---|---|---|---|
| 7,720,683 | B1 * | 5/2010 | Vermeulen | G10L 15/22 704/235 |
| 8,489,987 | B2 * | 7/2013 | Erol | G06F 16/955 707/724 |
| 8,719,768 | B2 * | 5/2014 | Hass | G06F 8/71 717/104 |
| 8,762,298 | B1 * | 6/2014 | Ranjan | G06F 21/552 706/12 |
| 11,182,432 | B2 * | 11/2021 | Shi | G06F 16/90332 |
| 11,580,677 | B2 * | 2/2023 | Palma | G06T 11/006 |

(Continued)

OTHER PUBLICATIONS

Radford et al., "Learning Transferable Visual Models From Natural Language Supervision", arXiv:2103.00020v1 [cs.CV], Feb. 26, 2021 (48 pages).

(Continued)

*Primary Examiner* — Hanh B Thai
(74) *Attorney, Agent, or Firm* — Chamberlain, Hrdlicka, White, Williams & Aughtry; Aly Z. Dossa

(57) ABSTRACT

A method for managing a framework includes: receiving, by a GUI, a query that is sent to a first module; analyzing, by the first module, the query to infer intention; making, by the first module, a determination that the intention is not searching for an object in a database; sending, by the first module, the query to a second module; transforming, by the second module, the query into a vector that is sent to a third module; performing, by the third module and using the vector, a search for a nearest image in the database; identifying, by the third module, a path associated with the nearest image, which is sent to an analyzer, in which the analyzer further sends the path to a fourth module; and fetching, by the fourth module and based on the path, an image from a store, which is sent to the GUI.

20 Claims, 13 Drawing Sheets

(56) References Cited

U.S. PATENT DOCUMENTS

| | | | | |
|---|---|---|---|---|
| 11,941,043 | B2* | 3/2024 | Ezrielev | G06F 16/532 |
| 2013/0009959 | A1* | 1/2013 | Calamante | G01R 33/56341 |
| | | | | 345/428 |
| 2016/0378861 | A1* | 12/2016 | Eledath | G06V 20/52 |
| | | | | 707/766 |
| 2019/0279633 | A1* | 9/2019 | Venkata | G06F 16/632 |
| 2020/0272655 | A1* | 8/2020 | Roy | G06F 17/15 |
| 2020/0408533 | A1* | 12/2020 | Pesala | G01P 13/00 |
| 2021/0097374 | A1* | 4/2021 | Liu | G06F 16/9535 |
| 2021/0174578 | A1* | 6/2021 | Jurgenson | G06T 19/006 |
| 2021/0224332 | A1* | 7/2021 | Shekhar | G06N 3/08 |
| 2021/0294781 | A1* | 9/2021 | Fernández Musoles | |
| | | | | G06F 16/367 |
| 2021/0294828 | A1* | 9/2021 | Tomkins | G10L 15/063 |
| 2021/0294970 | A1* | 9/2021 | Bender | G06F 16/3329 |
| 2022/0284028 | A1* | 9/2022 | Meng | G06F 16/3347 |
| 2022/0292812 | A1* | 9/2022 | Hsiao | G06F 16/353 |
| 2022/0309037 | A1* | 9/2022 | Gutierrez | G06F 16/16 |
| 2022/0414492 | A1* | 12/2022 | Jezewski | G06N 5/04 |
| 2023/0089148 | A1* | 3/2023 | Dai | G06F 16/5854 |
| | | | | 382/103 |
| 2023/0122874 | A1* | 4/2023 | Gupta | G06F 18/24 |
| | | | | 707/723 |
| 2023/0185799 | A1* | 6/2023 | Hoang | G06N 3/096 |
| | | | | 704/2 |
| 2023/0245418 | A1* | 8/2023 | Zhang | G06F 16/954 |
| | | | | 382/156 |
| 2024/0062011 | A1* | 2/2024 | Kanuga | G06F 40/35 |
| 2024/0127287 | A1* | 4/2024 | Hong | G06Q 30/0256 |
| 2024/0134850 | A1* | 4/2024 | Xu | G06F 16/24522 |
| 2024/0289554 | A1* | 8/2024 | Galli | G06F 16/954 |
| 2024/0346047 | A1* | 10/2024 | Kumar | G06F 16/285 |
| 2024/0386015 | A1* | 11/2024 | Crabtree | G06F 16/9024 |
| 2024/0419726 | A1* | 12/2024 | Jenni | G06F 16/535 |
| 2025/0111167 | A1* | 4/2025 | Mcintyre | G06F 16/383 |

OTHER PUBLICATIONS

Christoph Schuhmann et al., "Laion-5B: An open large-scale dataset for training next generation image-text models", arXiv: 2210.08402v1 [cs.CV], Oct. 16, 2022 (50 pages).

Gadre et al., "Datacomp: In search of the next generation of multimodal datasets", arXiv:2304.14108v5 [cs.CV], Oct. 20, 2023 (66 pages).

* cited by examiner

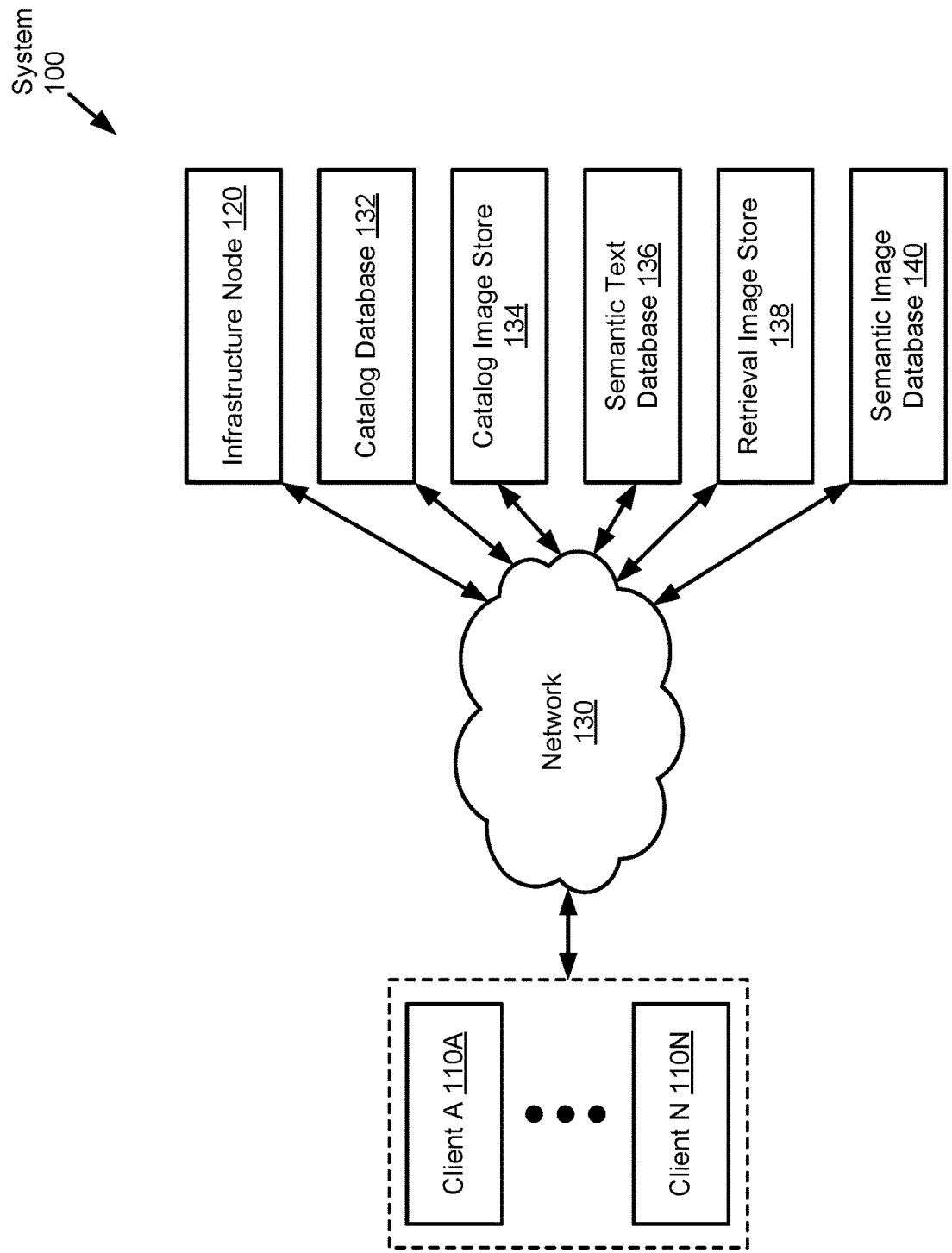

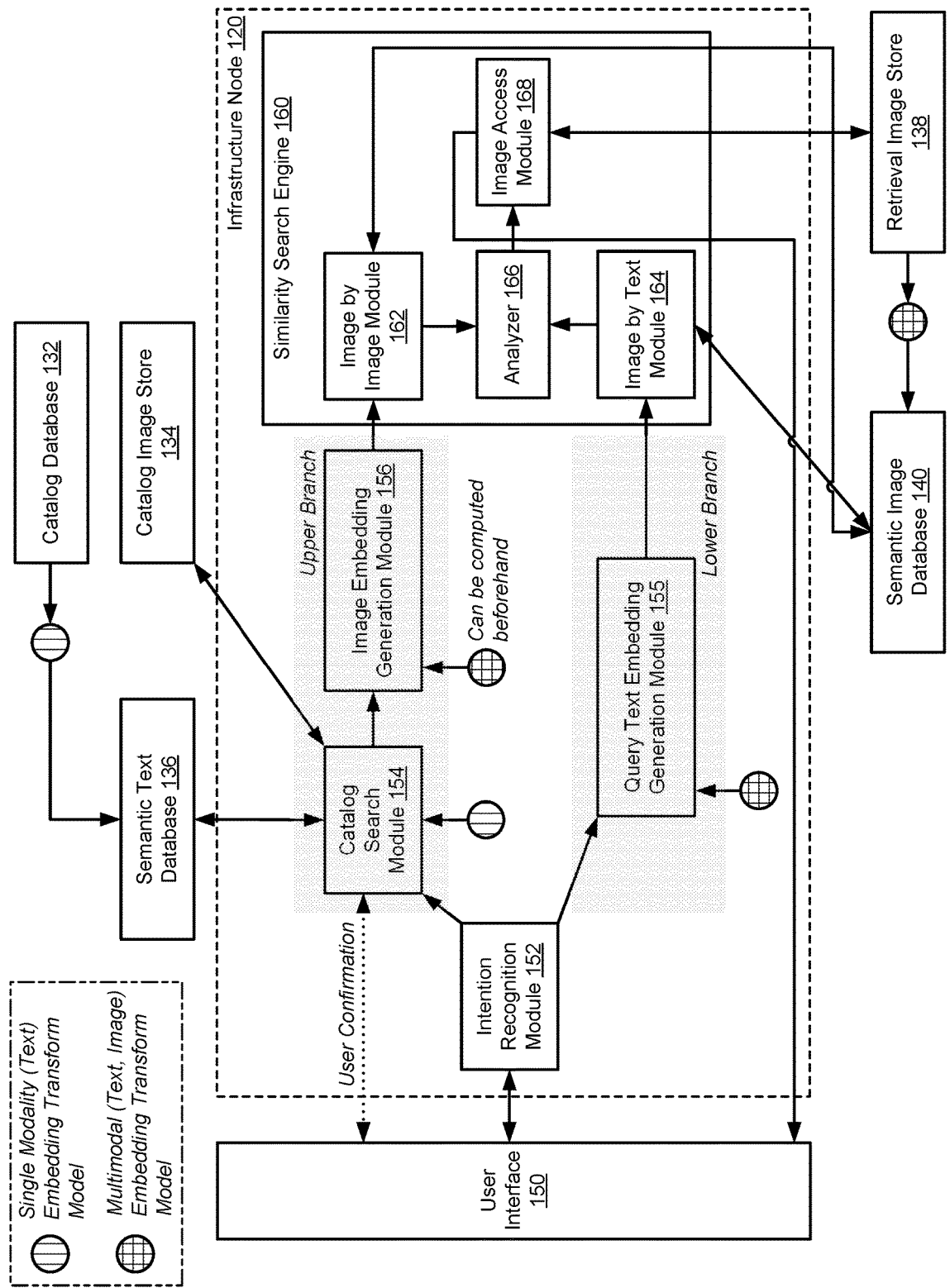
FIG. 1.2

*Example knowledge stored in the Catalog Database – in a JSON Format*

```
[
  { "Product Name": "No. 100 Screw",
    "Material": "Stainless Steel",
    "Shape": "T-Shaped",
    "Surface Treatment": "Zinc Plating",
    "Size": "Standard Size (Customizable)",
    "Usage Description": "Suitable for woodworking and metal engineering. Provides strong connection and support.",
    "Image Path": abc://my-bucket-name/path/X/images/100.jpg"
  },
  { "Product Name": "No. 200 Screw",
    "Material": "Alloy Steel",
    "Shape": "L-Shaped",
    "Surface Treatment": "Phosphating",
    "Size": "Various sizes available",
    "Usage Description": "Used in building structures and mechanical equipment. Provides high tensile strength and corrosion resistance.",
    "Image Path": abc://my-bucket-name/path/X/images/200.jpg"
  },
  { "Product Name": "No. 300 Screw",
    "Material": "Copper Alloy",
    "Shape": "Hexagonal Head",
    "Surface Treatment": "Nickel Plating",
    "Size": "Medium Size (Customizable)",
    "Usage Description": "Used for electronic devices and furniture assembly. Provides reliable electrical connection and decorative features.",
    "Image Path": abc://my-bucket-name/path/X/images/300.jpg"
  }
]
```

FIG. 2.1

*Example knowledge stored in the Catalog Database – Data Schema in the Catalog Database*

```
CREATE TABLE ProductCatalog (
ProductID INT PRIMARY KEY,
ProductName VARCHAR (255),
Material VARCHAR (255),
Shape VARCHAR (255),
SurfaceTreatment VARCHAR (255),
Size VARCHAR (255),
UsageDescription TEXT,
ImagePath VARCHAR (255) );
```

FIG. 2.2

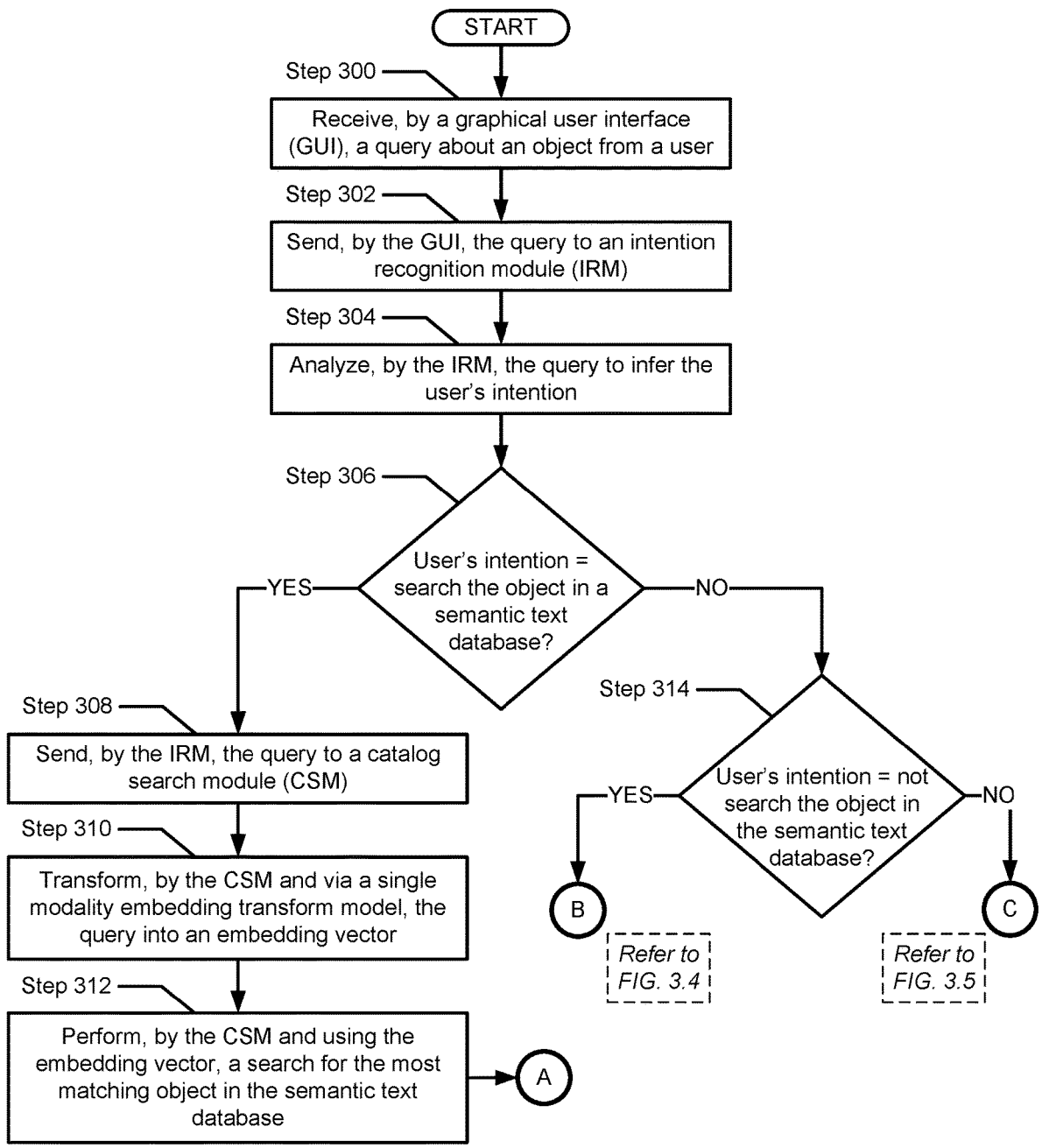
FIG. 3.1

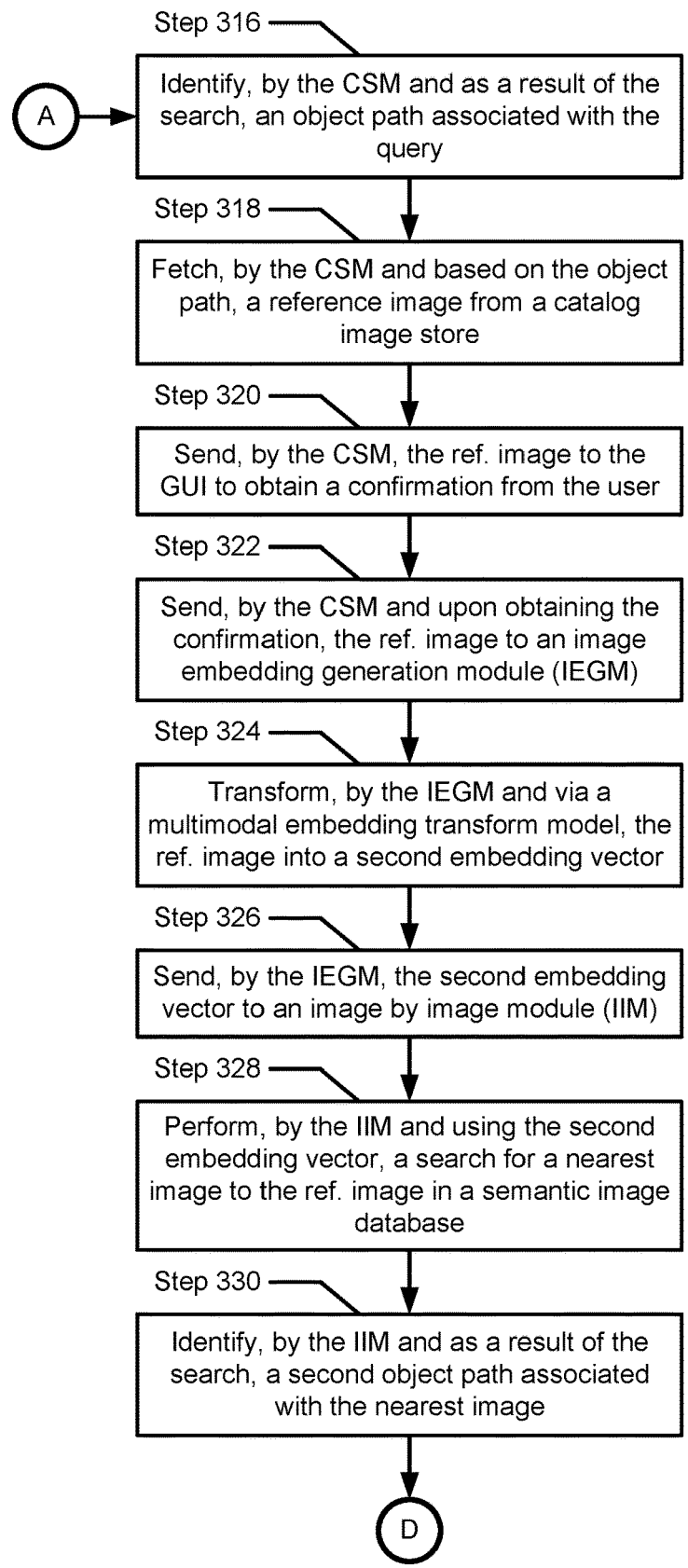
FIG. 3.2

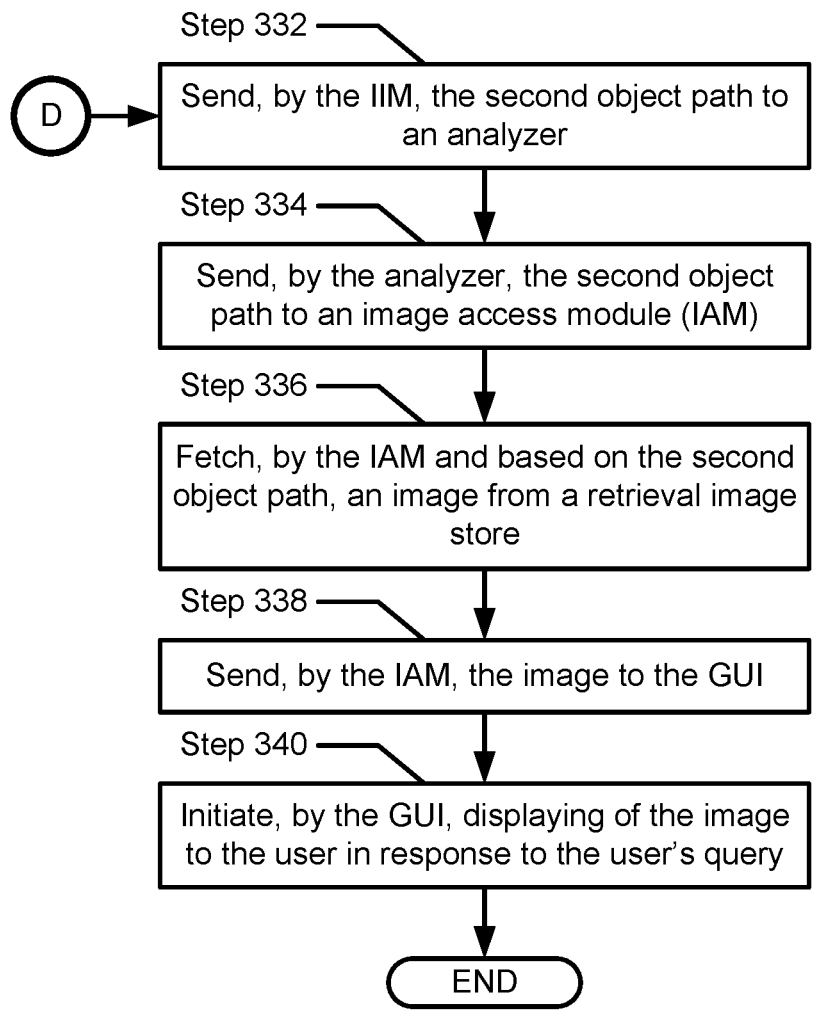
FIG. 3.3

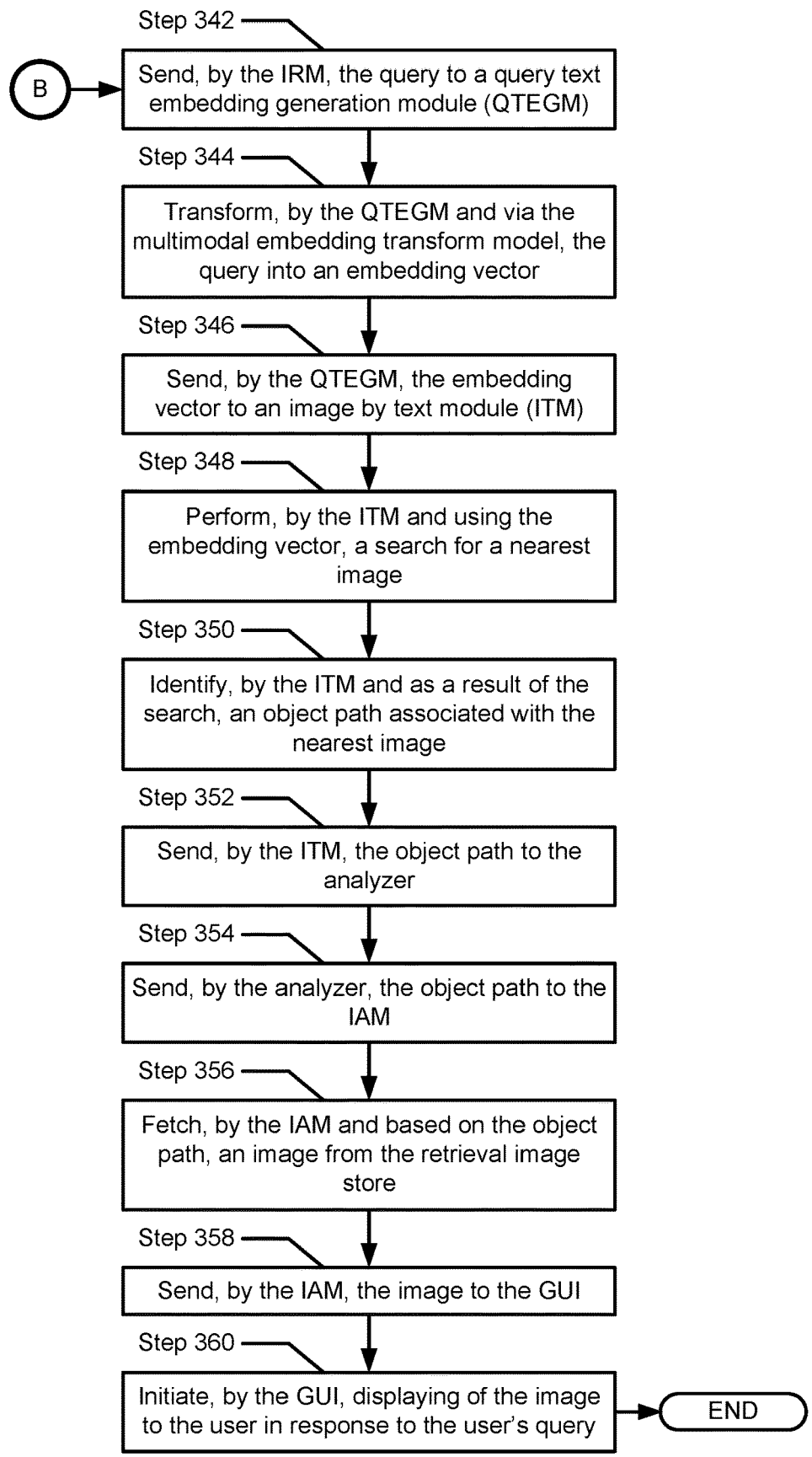
FIG. 3.4

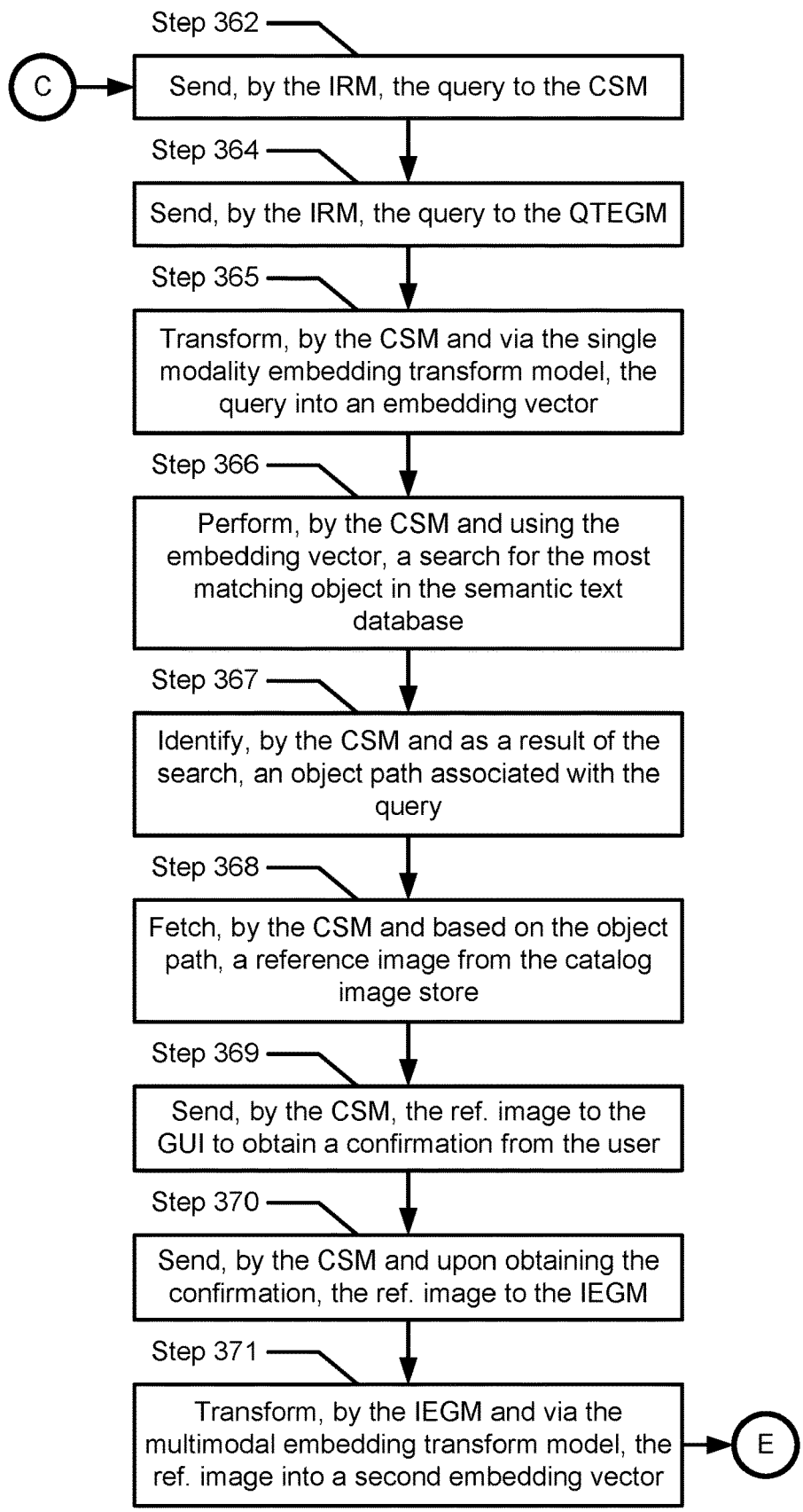
FIG. 3.5

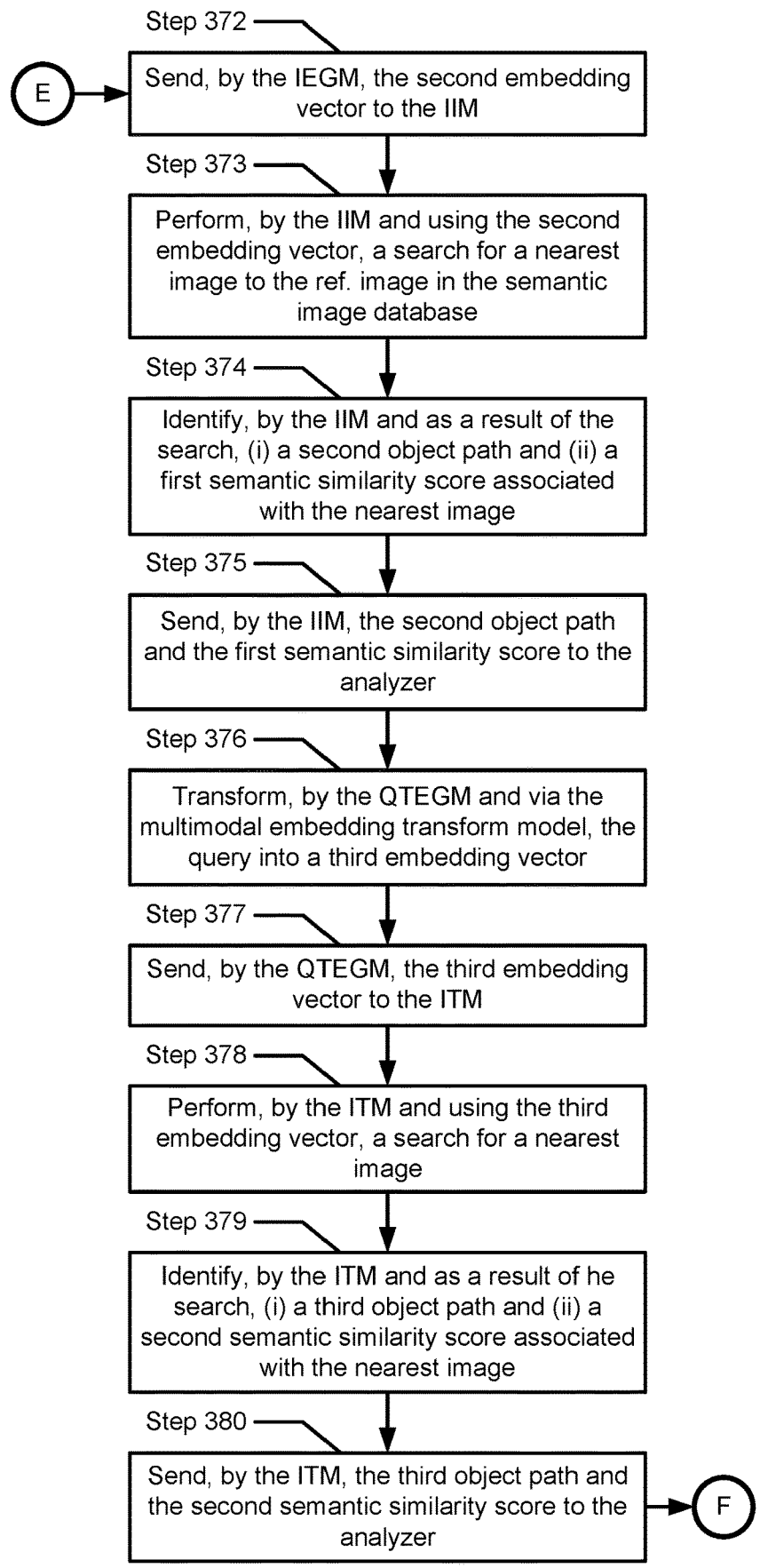
FIG. 3.6

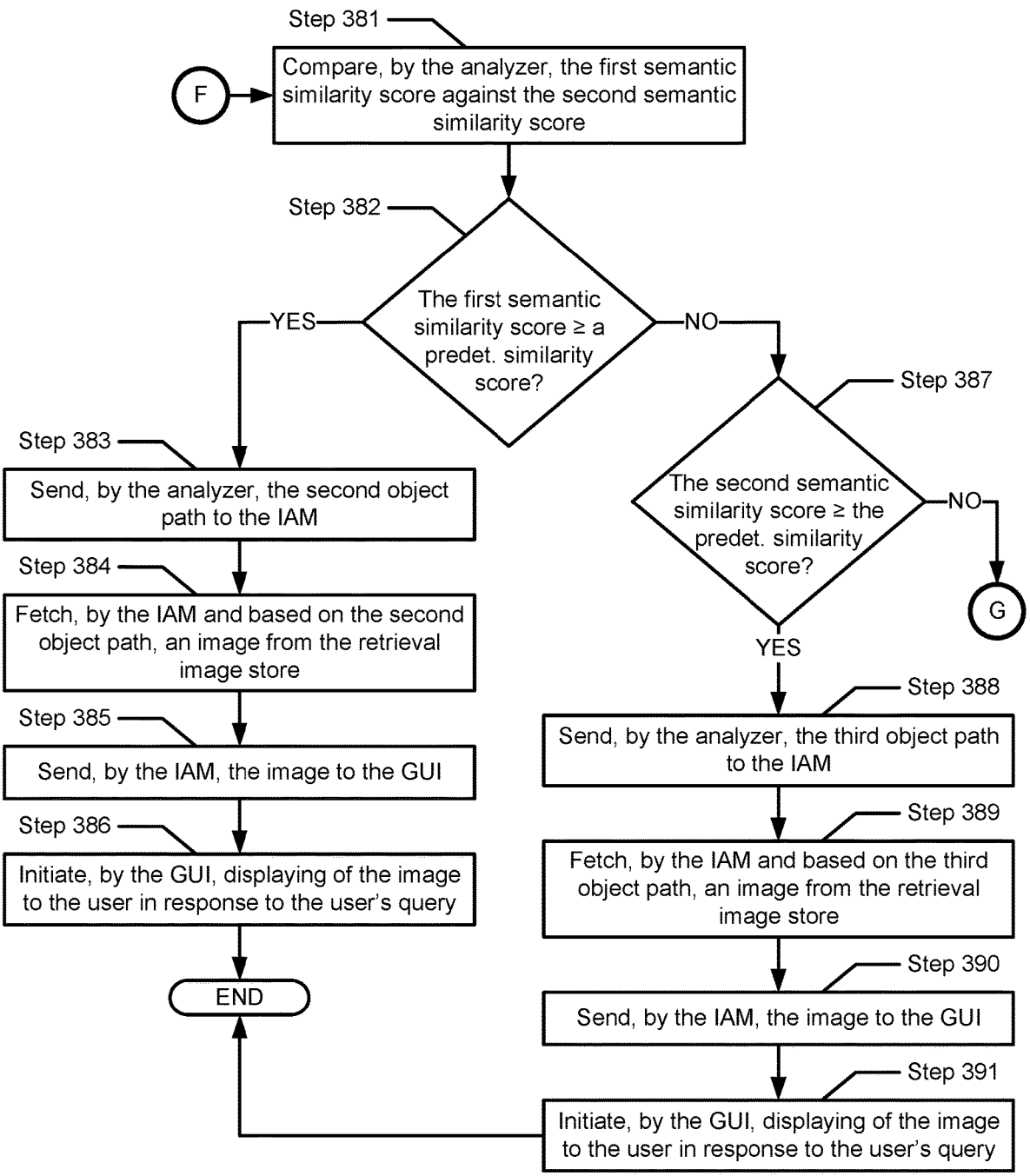
FIG. 3.7

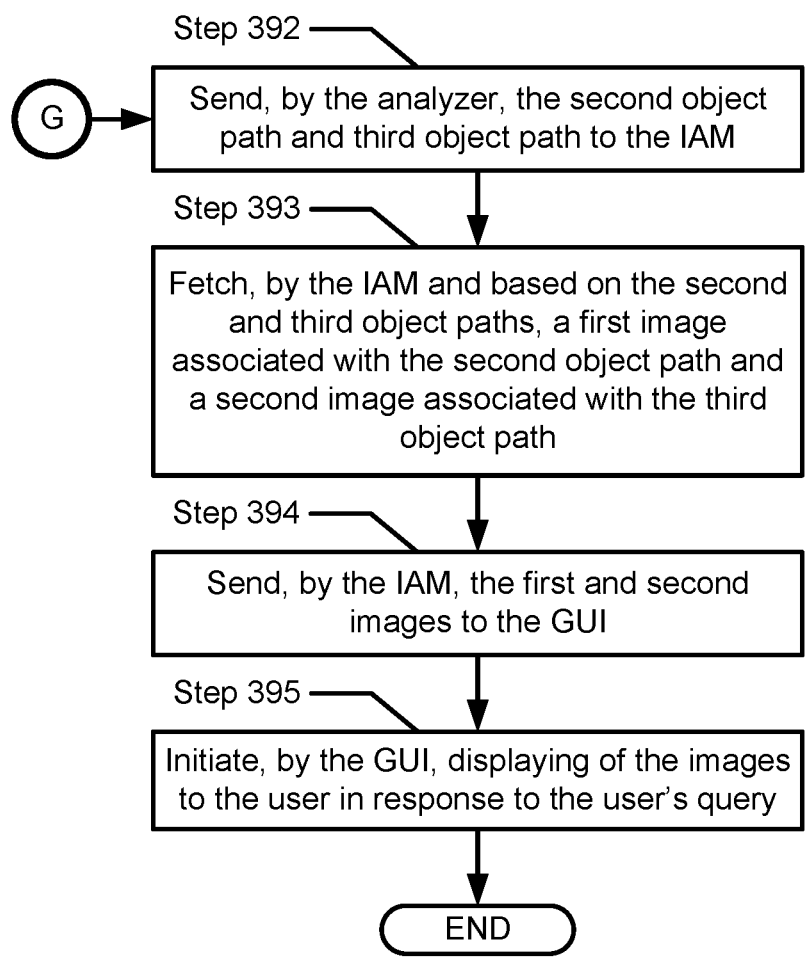
FIG. 3.8

METHOD AND SYSTEM FOR A TEXT-VISION RETRIEVAL FRAMEWORK

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.1 shows a diagram of a system in accordance with one or more embodiments of the invention.

FIG. 1.2 shows components of an infrastructure node in accordance with one or more embodiments of the invention.

FIG. 2.1 shows example knowledge stored in a catalog database in accordance with one or more embodiments of the invention.

FIG. 2.2 shows example knowledge stored in the catalog database in accordance with one or more embodiments of the invention.

FIGS. 3.1-3.8 show a method for managing an image retrieval framework in accordance with one or more embodiments of the invention.

DETAILED DESCRIPTION

Figure 4:
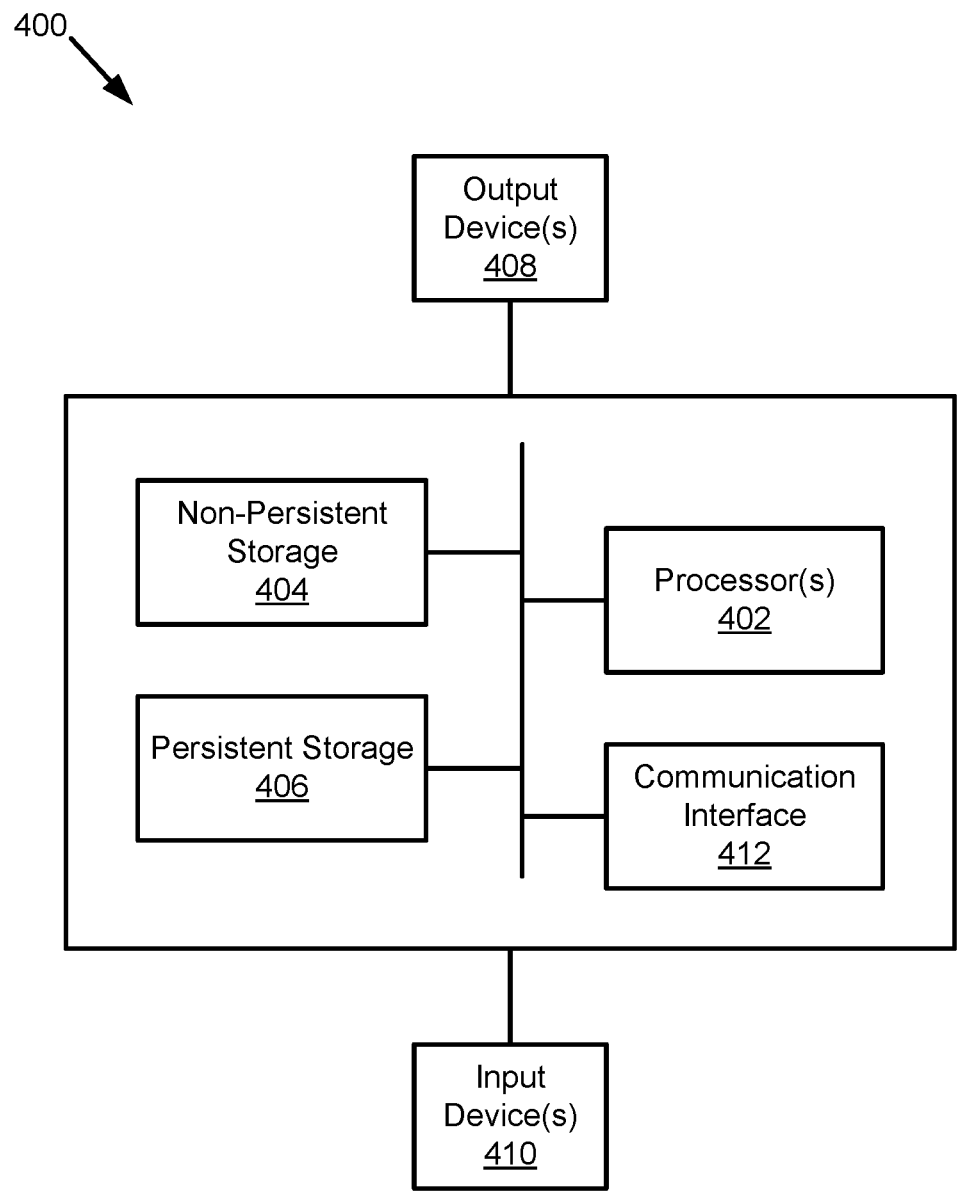
FIG. 4 shows a diagram of a computing device in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In recent years, the emergence of pre-trained multimodal models has been a major breakthrough in the field of machine learning (ML)/artificial intelligence (AI). These models are trained on extensive data sets, which typically include interconnected data from different modalities, such as images and textual descriptions of image content. In most cases, pre-trained models demonstrate an understanding of semantic relationships between different modalities (such as the correspondence of the word "cat" in text to an actual image of a cat), and for data sets with relatively generic image content, these models (e.g., the Contrastive Language-Image Pretraining (CLIP) model) have proven their value.

In most cases, a pre-trained model (e.g., a single-modal model, a multimodal model, etc.) may represent data as one or more embeddings (or embedding vectors). These vectors may serve as the pre-trained model's semantic understanding of the data. By expressing various different data as such embedding vectors, one may compare their semantic similarities by calculating the distance among these vectors (typically using cosine similarity). The functionality of a vector database (e.g., FAISS) may support the aforementioned approach by efficiently facilitating one or more Approximate Nearest Neighbor searches (ANNs) through storing large-scale vectors and optimizing their indexing, through techniques such as Hierarchical Navigable Small Worlds (HNSWs).

The widespread attention to these techniques has been further increased by the rise of large models (e.g., Large Language Models (LLMs)). Typically, to consider custom data in an LLM involved application, one may need to include the custom data in an input prompt before sending the prompt to an LLM Application Programming Interface (API). To manage the custom data more effectively, the custom data may be transformed into one or more embedding vectors and stored in a vector database. These vectors may then be retrieved based on the prompt, and the resulting data may be combined with the prompt to form a newer prompt (e.g., to subsequently invoke the LLM API in order to obtain responses that consider the custom data). The aforementioned approach may fall under the domain of prompt engineering. More specifically, the aforementioned approach may be categorized as the Retrieval Augmented Generation (RAG) approach, which uses precise information obtained through retrieval to enhance the outcome of a generative model.

Further, the application of pre-trained multimodal large models may follow a similar process. For example, one may employ the CLIP model to extract embedding vectors from frames/images and then store them to a vector database. When a text query is received as input, its embedding(s) may be retrieved and compared by performing a similarity search in the vector database, enabling the retrieval of images that are semantically related to the text query (e.g., searching for "a man taking milk" and obtaining one or more frames with a person holding milk).

Despite the generalization capabilities of pre-trained models, issues may arise when applying these models to use cases that require private user domain knowledge. For example, in an organization setting with various models of components, if images of these components (e.g., a product catalog) have not been part of a pre-trained model's training data, distinguishing these images may be challenging. One possible approach to address the aforementioned challenge may be fine-tuning, in which a user may need to (i) prepare annotated data sets, (ii) freeze one or more portions of the model's parameters (e.g., fixing or freezing 80% parameters of the pre-trained model during the fine-tuning), and/or (iii) retrain the model (especially if the user-specific custom data (e.g., a product catalog) has been updated, the fine-tuned model may need to be re-fine-tuned again). As indicated, fine-tuning, while more efficient than training a model from scratch, still requires substantial resources, including collecting, cleaning, and annotating specific data sets, as well as computational power (e.g., computing resources) for model training and maintenance (in particular, fine-tuning of a large model requires more computing resources).

Another possible approach to address the aforementioned challenge may be in-context learning capabilities of a large model. In particular, these capabilities may overcome the limitations of fine-tuning by enabling prompt engineering and without changing the model. More specifically, these capabilities may involve (i) externalizing a custom knowledge base from model calls, (ii) searching for relevant knowledge in the base, (iii) rebuilding prompts, and/or (iv) recalling the large model. By incorporating user-specific custom data into the model's input, prompt engineering may eliminate the costly fine-tuning.

However, in the case of text-vision multimodal data retrieval, there is no existing solution (especially from the perspective of in-context learning) that considers custom data as a reference. Most of the multimodal in-context learning based solutions focus on, for example, adjusting text prompts to generate better images or combining text with image prompts for improved vision responses.

For at least the reasons discussed above and without requiring resource (e.g., time, engineering, etc.) intensive efforts, a fundamentally different approach/framework is needed (e.g., a flexible and efficient multimodal text-vision retrieval framework that accommodates both general and custom knowledge-based searches).

Embodiments of the invention relate to methods and systems for managing an image retrieval framework. As a result of the processes discussed below, one or more embodiments disclosed herein advantageously ensure that: (i) enhanced capabilities are offered/provided to users (so that the users may utilize publicly trained large models with customized private knowledge (e.g., user-specific knowledge, a private catalog, a product catalog, user domain knowledge, user-specific custom data, etc.)); (ii) generalization capabilities of public large models (e.g., single modality embedding transform models, multimodal embedding transform models, etc.) are leveraged (so that the framework interprets users' text inputs and retrieves corresponding images); (iii) to provide specific domain query support (to users), user-specific knowledge (e.g., user-specific custom knowledge, data of interest, etc.) is seamlessly integrated into an image retrieval process (e.g., a text-vision retrieval process) without the need for resource-intensive large model fine-tuning; (iv) at least "text in/text out" and "text in/image out" use cases are supported; (v) a concept of a "parallel branch" design or a "dual-branch" design (see FIG. 2.1) is introduced within the framework to empower users to search objects while considering both general and custom knowledge (e.g., in order to respond to a broader range of user intentions); (vi) a customizable result ensemble strategy (or a customizable result analysis strategy) is provided to users to enable the users to manage the bias in search results (so that users may have better personalized/tailored data retrieval experience); (vii) no fine-tuning is required (therefore, no need for users to collect and label data for large model training; however, the framework does not conflict with the concept of fine-tuning); (viii) flexible control and easy integration are allowed for user-specific custom knowledge (e.g., users may only need to provide a highly refined knowledge base containing textual descriptions and image information (e.g., a product catalog outlining each object's/component's standard appearance)); and/or (ix) while text and vision modalities are supported, the framework may be extended to support other modalities (e.g., for a better user/customer experience, for a better product management and development, etc.).

The following describes various embodiments of the invention.

FIG. 1.1 shows a diagram of a system (100) in accordance with one or more embodiments of the invention. The system (100) includes any number of clients (e.g., Client A (110A), Client B (110B), etc.), a network (130), any number of infrastructure nodes (e.g., 120), a catalog database (132), a catalog image store (134), a semantic text database (136), a retrieval image store (138), and a semantic image database (140). The system (100) may facilitate management and virtualization of data from any number of data sources (e.g., 132, 134, etc.). The system (100) may include additional, fewer, and/or different components without departing from the scope of the invention. Each component may be operably/operatively connected to any of the other components via any combination of wired and/or wireless connections. Each component illustrated in FIG. 1.1 is discussed below.

In one or more embodiments, the clients (e.g., 110A, 110B, etc.), the network (130), the infrastructure node (120), the catalog database (132), the catalog image store (134), the semantic text database (136), the retrieval image store (138), and the semantic image database (140) may be (or may include) physical hardware or logical devices, as discussed below. While FIG. 1.1 shows a specific configuration of the system (100), other configurations may be used without departing from the scope of the invention. For example, although the clients (e.g., 110A, 110B, etc.) and the infrastructure node (120) are shown to be operatively connected through a communication network (e.g., 130), the clients (e.g., 110A, 110B, etc.) and the infrastructure node (120) may be directly connected (e.g., without an intervening communication network).

Further, the functioning of the clients (e.g., 110A, 110B, etc.) and the infrastructure node (120) is not dependent upon the functioning and/or existence of the other components (e.g., devices) in the system (100). Rather, the clients and the infrastructure node may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data) (including multiple events, each of which is associated with a routing key) that are continuously produced by streaming data sources (e.g., writers, clients, etc.), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing data) and may deliver at least computing power (e.g., real-time (e.g., on the order of milliseconds (ms) or less) network monitoring, server virtualization, etc.), storage capacity (e.g., data backup), and data protection (e.g., software-defined data protection, disaster recovery, etc.) as a service to users (e.g., end-users) of clients (e.g., 110A, 110B, etc.). The system (100) may also represent a comprehensive middleware layer executing on computing devices (e.g., 400, FIG. 4) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110B, etc.)) and other computations remotely (e.g., away from the users' site using the infrastructure node (120)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110B, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the infrastructure node (120)), store, or otherwise utilize captured sensor data (and/or any other type and/or quantity of data), and (iv) provide surveillance services (e.g., determining object-level information (e.g., information regarding objects in a scene that may be provided to other entities in the system), performing face recognition, etc.) for scenes (e.g., a physical region of space). One of ordinary skill will appreciate that the client may perform other functionalities without departing from the scope of the invention.

In one or more embodiments, the clients (e.g., 110A, 110B, etc.) may be geographically distributed devices (e.g., user devices, front-end devices, edge devices, etc.) and may have relatively restricted hardware and/or software resources when compared to the infrastructure node (120). As being, for example, a sensing device, each of the clients may be adapted to provide scene monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

As yet another example, a camera may provide sensor data in the form of images of objects in a scene. The sensor data may be used to, for example, infer a rate of vehicles that pass by the camera, a number of people on a walkway at a point-in-time, characteristics (e.g., position/orientation, a state of an optical indicate such as a light, etc.) of a second camera, etc. While the scene (e.g., a region of space) has been illustrated as including a limited number and specific types of components, regions of space in accordance with embodiments of the invention may include additional, fewer, and/or different components without departing from the scope of the invention.

Additionally, while the scene has been illustrated as having a specific shape, sensing devices in accordance with one or more embodiments of the invention may monitor scenes having different shapes. Further, the scenes monitored by different sensing devices may have different or the same shape without departing from the scope of the invention.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the invention. For example, the sensor data may be implemented as a tree, a table, a linked list, etc.

In one or more embodiments, the clients (e.g., 110A, 110B, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110B, etc.) may correspond to computing devices that one or more users use to interact with one or more components of the system (100).

In one or more embodiments, a client (e.g., 110A, 110B, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110B, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110B, etc.) may include functionality to request and use physical and logical resources of the client. Applications may also include functionality to use data stored in storage/memory resources of the client. The applications may perform other types of functionalities not listed above without departing from the scope of the invention. While providing application services to a user, applications may store data that may be relevant to the user in storage/memory resources of the client.

In one or more embodiments, to provide services to the users, the clients (e.g., 110A, 110B, etc.) may utilize, rely on, or otherwise cooperate with the infrastructure node (120). For example, the clients may issue requests to the infrastructure node to receive responses and interact with various components of the infrastructure node. The clients may also request data from and/or send data to the infrastructure node (for example, the clients may transmit information (e.g., one or more queries initiated by users) to the infrastructure node that allows the infrastructure node to perform computations, the results of which are used by the clients to provide services to the users). As yet another example, the clients may utilize application services provided by the infrastructure node. When the clients interact with the infrastructure node, data that is relevant to the clients may be stored (temporarily or permanently) in the infrastructure node.

In one or more embodiments, a client (e.g., 110A, 110B, etc.) may be capable of, e.g.: (i) collecting users' inputs (e.g., data retrieval queries), (ii) correlating collected users' inputs to the computer-implemented services to be provided to the users, (iii) communicating with the infrastructure node (120) that performs computations necessary to provide the computer-implemented services, (iv) using the computations performed by the infrastructure node to provide the computer-implemented services in a manner that appears (to the users) to be performed locally to the users, and/or (v) communicating with any virtual desktop (VD) in a virtual desktop infrastructure (VDI) environment (or a virtualized architecture) provided by the infrastructure node (using any known protocol in the art), for example, to exchange remote desktop traffic or any other regular protocol traffic (so that, once authenticated, users may remotely access independent VDs).

In one or more embodiment, a VDI environment (or a virtualized architecture) may be employed for numerous reasons, for example (but not limited to): to manage resource (or computing resource) utilization, to provide cost-effective scalability across multiple servers, to provide a workload portability across multiple servers, to streamline an application development by certifying to a common virtual interface rather than multiple implementations of physical hardware, to encapsulate complex configurations into a file that is easily replicated and provisioned, etc.

As described above, the clients (e.g., 110A, 110B, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110B, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the infrastructure node (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110B, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of DRAM and 1 CPU with 12 cores, whereas Client N (110N) may have 8 GB of PMEM and 1 CPU with 16 cores. Other different computational capabilities of the clients not listed above may also be taken into account without departing from the scope of the invention.

Further, in one or more embodiments, a client (e.g., 110A, 110B, etc.) may be implemented as a computing device (e.g., 400, FIG. 4). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110B, etc.) may be implemented as a logical device (e.g., a VM). The logical device may utilize the computing resources of any number of computing devices to provide the functionality of the client described throughout this application.

In one or more embodiments, users may interact with (or operate) the clients (e.g., 110A, 110B, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the infrastructure node (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the infrastructure node (120) may include functionality to, e.g.: (i) obtain (or receive) data (e.g., any type and/or quantity of input) from any source (and, if necessary, aggregate the data); (ii) perform complex analytics and analyze data that is received from other components (e.g., 110A, 134, 136, etc.) of the system (100) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to a storage device for management of the data and/or for storage of the data (while pushing the data, the infrastructure node may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing a linear, non-linear, and/or ML model to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another infrastructure node for review and/or other human interactions; (x) exchange data with other devices registered in/to the network (130) in order to, for example, participate in a collaborative workload placement (e.g., the infrastructure node may split up a request (e.g., an operation, a task, an activity, etc.) with another infrastructure node, coordinating its efforts to complete the request more efficiently than if the infrastructure node (120) had been responsible for completing the request); (xi) provide software-defined data protection for the clients (e.g., 110A, 110B, etc.); (xii) provide automated data discovery, protection, management, and recovery operations for the clients; (xiii) monitor operational states of the clients; (xiv) regularly back up configuration information of the clients to a storage device; (xv) provide (e.g., via a broadcast, multicast, or unicast mechanism) information (e.g., a location identifier, the amount of available resources, etc.) associated with the infrastructure node (120) to other infrastructure nodes in the system (100); (xvi) configure or control any mechanism that defines when, how, and what data to provide to the clients and/or to a storage device; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., the infrastructure node (120) may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the infrastructure node (120) may communicate with, for example, a storage device (e.g., 132, 134, 136, 138, 140, etc.). Additional details of the infrastructure node (120) are described below in reference to FIG. 1.2.

In one or more embodiments, monitoring the operational states of the clients (e.g., 110A, 110B, etc.) may be used to determine whether it is likely that the monitoring of the scenes by the clients results in information regarding the scenes that accurately reflects the states of the scenes (e.g., a client may provide inaccurate information regarding a monitored scene). Said another way, by providing monitoring services, the infrastructure node (120) may be able to determine whether a client is malfunctioning (e.g., the operational state of a client may change due to a damage to the client, malicious action (e.g., hacking, a physical attack, etc.) by third-parties, etc.). If the client is not in the predetermined operational state (e.g., if the client is malfunctioning), the infrastructure node (120) may take action to remediate the client. Remediating the client may result in the client being placed in the predetermined operational state which improves the likelihood that monitoring of the scene by the client results in the generation of accurate information regarding the scene.

As described above, the infrastructure node (120) may be capable of providing a range of functionalities/services to the users of the clients (e.g., 110A, 110B, etc.). However, not all of the users may be allowed to receive all of the services. To manage the services provided to the users of the clients, a system (e.g., a service manager) in accordance with embodiments of the invention may manage the operation of a network (e.g., 130), in which the clients are operably connected to the infrastructure node. Specifically, the service manager (i) may identify services to be provided by the infrastructure node (for example, based on the number of users using the clients) and (ii) may limit communications of the clients to receive infrastructure node provided services.

For example, the priority (e.g., the user access level) of a user may be used to determine how to manage computing resources of the infrastructure node (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the infrastructure node (120) (e.g., while the computing resources of the infrastructure node may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the infrastructure node (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single infrastructure node (e.g., 120) is considered above, the term "node" includes any collection of systems or sub-systems that individually or jointly execute a set, or multiple sets, of instructions to provide one or more computer-implemented services. For example, a single infrastructure node may provide a computer-implemented service on its own (i.e., independently) while multiple other nodes may provide a second computer-implemented service cooperatively (e.g., each of the multiple other nodes may provide similar and or different services that form the cooperatively provided service).

As described above, the infrastructure node (120) may provide any quantity and any type of computer-implemented services. To provide computer-implemented services, the infrastructure node may be a heterogeneous set, including a collection of physical components/resources (discussed above) configured to perform operations of the node and/or otherwise execute a collection of logical components/resources (discussed above) of the node.

In one or more embodiments, the infrastructure node (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the invention.

One of ordinary skill will appreciate that the infrastructure node (120) may perform other functionalities without departing from the scope of the invention. In one or more embodiments, the infrastructure node may be configured to perform (in conjunction with the remaining components of the system (100)) all, or a portion, of the functionalities described in FIGS. 3.1-3.8.

In one or more embodiments, the infrastructure node (120) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the infrastructure node described throughout the application.

Alternatively, in one or more embodiments, similar to a client (e.g., 110A, 110B, etc.), the infrastructure node may also be implemented as a logical device.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the infrastructure node, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the infrastructure node through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

In one or more embodiments, the catalog database (132) (e.g., a relational database) may provide long-term, durable, high read/write throughput data storage/protection with near-infinite scale and low-cost. The catalog database (132) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the catalog database (132) may also occupy a portion of a physical storage/memory device or, alternatively, may span across multiple physical storage/memory devices.

In one or more embodiments, the catalog database (132) may be implemented using physical devices that provide data storage services (e.g., storing data and providing copies of previously stored data). The devices that provide data storage services may include hardware devices and/or logical devices. For example, the catalog database (132) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the catalog database (132) may include a memory device (e.g., a dual in-line memory device), in which data is stored and from which copies of previously stored data are provided. As yet another example, the catalog database (132) may include a persistent storage device (e.g., an SSD), in which data is stored and from which copies of previously stored data is provided. As yet another example, the catalog database (132) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the catalog database (132) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the catalog database (132) may store/log/record unstructured and/or structured data and/or metadata that may include (or specify), for example (but not limited to): (user provided) custom data (e.g., domain custom knowledge (specifically referring to knowledge with a correspondence(s) between text/query/request and images, mostly in the form of a product catalog/manual), a physical product/object catalog (e.g., a ".pdf" formatted product manual), a logical product/object catalog (see e.g., FIG. 2.1), a domain custom knowledge base, etc.), a data schema (see e.g., FIG. 2.2), information/explanation with respect to what kind of data is stored in the catalog database, an identifier (or a model name) of a product, material information of a product, shape information of a product, surface treatment information of a product, a size of a product, usage description associated with a product, an image path associated with a product's image, historical product data and its corresponding details, information regarding a sender (e.g., a malicious user, a high priority trusted user, a low priority trusted user, etc.) of custom data, information regarding the size of custom data (or data packets of the custom data), a cumulative history of user activity records obtained over a prolonged period of time, a cumulative history of network traffic logs obtained over a prolonged period of time, previously received malicious data access/retrieval requests from an invalid user, a backup history documentation of a workload, a version of an application, a product identifier of an application, an index of an asset (e.g., a file, a folder, a segment, etc.), recently obtained customer/user information (e.g., records, credentials, etc.) of a user, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the semantic text database (136), etc. Based on the aforementioned data, for example, the catalog database (132) may perform user analytics to infer profiles of users communicating with the catalog database.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the catalog database (132) may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of the database may receive various data related inputs/queries directly (or indirectly) from Client A (110A). Upon receiving, the agent may analyze those inputs to generate an index(es) for optimizing the performance of the database by reducing a required amount of database access(es) when implementing a request (e.g., a data retrieval request). In this manner, requested data may be quickly located and accessed from the database using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data (of the catalog database (132)) may be maintained by, for example, the infrastructure node (120). The infrastructure node may add, remove, and/or modify those data in the catalog database to cause the information included in the catalog database to reflect the latest version of, for example, product information. The unstructured and/or structured data available in the catalog database (132) may be implemented using, for example, lists, tables, unstructured data, structured data, etc. While described as being stored locally, the unstructured and/or structured data may be stored remotely, and may be distributed across any number of devices without departing from the scope of the invention.

While the catalog database (132) has been illustrated and described as including a limited number and type of data, the catalog database may store additional, less, and/or different data without departing from the scope of the invention. In the embodiments described above, the catalog database (132) is demonstrated as a remote entity; however, embodiments herein are not limited as such. In one or more embodiments, the catalog database (132) may be a local entity to clients (e.g., 110A, 110B, etc.) or to the infrastructure node (120).

One of ordinary skill will appreciate that the catalog database (132) may perform other functionalities without departing from the scope of the invention. The catalog database (132) may be implemented using hardware, software, or any combination thereof.

In one or more embodiments, the catalog image store (134) may provide long-term, durable, high read/write throughput data storage/protection with near-infinite scale and low-cost. The catalog image store (134) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the catalog image store (134) may also occupy a portion of a physical storage/memory device or, alternatively, may span across multiple physical storage/memory devices.

In one or more embodiments, the catalog image store (134) may be implemented using physical devices that provide data storage services (e.g., storing data and providing copies of previously stored data). The devices that provide data storage services may include hardware devices and/or logical devices. For example, the catalog image store (134) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the catalog image store (134) may include a memory device (e.g., a dual in-line memory device), in which data is stored and from which copies of previously stored data are provided. As yet another example, the catalog image store (134) may include a persistent storage device (e.g., an SSD), in which data is stored and from which copies of previously stored data is provided. As yet another example, the catalog image store (134) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the catalog image store (134) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the catalog image store (134) may store/log/record unstructured and/or structured data that may include (or specify), for example (but not limited to): images (e.g., "Screw 100.jpg", "Chair AB.jpg", etc.) of objects/products provided within custom data (e.g., corresponding images of the objects described (via text) in the catalog database (132), which means domain custom knowledge/information may be stored separately in the catalog database (132) and in the catalog image store (134)), historical product data and its corresponding details, information regarding a sender (e.g., a malicious user, a high priority trusted user, a low priority trusted user, etc.) of custom data, information regarding the size of custom data (or data packets of the custom data), a cumulative history of user activity records obtained over a prolonged period of time, a cumulative history of network traffic logs obtained over a prolonged period of time, previously received malicious data access/retrieval requests from an invalid user, a backup history documentation of a workload, a version of an application, a correspondence between a query and an image, a product identifier of an application, an index of an asset, recently obtained customer/user information of a user, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the semantic text database (136), etc. Based on the aforementioned data, for example, the catalog image store (134) may perform user analytics to infer profiles of users communicating with the catalog image store (134).

As discussed above, the catalog database (132) stores, at least, textual descriptions of objects (provided within custom data) and associated image paths (e.g., a structured form of data, a file system path, etc.), while the catalog image store (134) stores, at least, images provided within the custom data so that a connection between the catalog database (132) and the catalog image store (134) may be established.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of images is received, a data restore operation is initiated, an ongoing data backup operation is fully completed, etc.

In one or more embodiments, similar to the catalog database (132), the catalog image store (134) may also provide an indexing service.

In one or more embodiments, the unstructured and/or structured data (of the catalog image store (134)) may be maintained by, for example, the infrastructure node (120). The infrastructure node may add, remove, and/or modify those data in the catalog image store to cause the information included in the catalog image store to reflect the latest version of, for example, product information. The unstructured and/or structured data available in the catalog image store (134) may be implemented using, for example, lists, tables, unstructured data, structured data, etc. While described as being stored locally, the unstructured and/or structured data may be stored remotely, and may be distributed across any number of devices without departing from the scope of the invention.

While the catalog image store (134) has been illustrated and described as including a limited number and type of data, the catalog image store may store additional, less, and/or different data without departing from the scope of the invention. In the embodiments described above, the catalog image store (134) is demonstrated as a remote entity; however, embodiments herein are not limited as such. In one or more embodiments, the catalog image store (134) may be a local entity to clients (e.g., 110A, 110B, etc.) or to the infrastructure node (120).

In the embodiments of the present disclosure, the catalog database (132) and the catalog image store (134) are demonstrated as separate entities; however, embodiments herein are not limited as such. The catalog database (132) may be demonstrated as a part of the catalog image store (134) (e.g., the catalog database and the catalog image store may be combined into a single storage device (e.g., the catalog image store), including both textual information and corresponding images).

One of ordinary skill will appreciate that the catalog image store (134) may perform other functionalities without departing from the scope of the invention. The catalog image store (134) may be implemented using hardware, software, or any combination thereof.

In one or more embodiments, the semantic text database (136) may provide long-term, durable, high read/write throughput data storage/protection with near-infinite scale and low-cost. The semantic text database (136) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the semantic text database (136) may also occupy a portion of a physical storage/memory device or, alternatively, may span across multiple physical storage/memory devices.

In one or more embodiments, the semantic text database (136) may be implemented using physical devices that provide data storage services (e.g., storing data and providing copies of previously stored data). The devices that provide data storage services may include hardware devices and/or logical devices. For example, the semantic text database (136) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the semantic text database (136) may include a memory device (e.g., a dual in-line memory device), in which data is stored and from which copies of previously stored data are provided. As yet another example, the semantic text database (136) may include a persistent storage device (e.g., an SSD), in which data is stored and from which copies of previously stored data is provided. As yet another example, the semantic text database (136) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the semantic text database (136) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, an agent (not shown) of the infrastructure node (120) may implement a single modality model (or a single modality (text) embedding transform model, see FIG. 1.2) to transform a text portion of custom data/knowledge (provided by a user) into one or more "text" embedding vectors (said another way, the single modality model is used to perform a text embedding process on the text portion of the custom data). To this end, (i) the custom data is made semantically searchable and (ii) users are enabled to find objects through a semantic matching process (rather than relying on a simple keyword matching process or a statistical "term frequency-inverse document frequency" (TF-IDF) matching process).

For example, if a user's query (or query text) includes "Model 100" and there is a "Model 100" screw" text in a corresponding product catalog, it constitutes a match. Further, user or application initiated searches may need to have a certain level of tolerance for a given text input. For example, if a user queries "cross-shaped screw and made by inox" and a corresponding product catalog contains "T-shaped screw, material: Stainless Steel" this should be considered as a match. Therefore, the text portion of custom data may need to be semantically indexed for search purposes (e.g., to optimize queries executed by a user, to allow the user to efficiently search for specific data items for a better user experience, to provide powerful data search (and/or retrieval) capabilities to corresponding entities, etc.). Said another way, one or more text embedding vectors (that are generated from the text portion of the custom data) may be stored in the semantic text database (136) and indexed, for example, to optimize an ANN search/query performed by a catalog search module (e.g., 154, FIG. 1.2).

As used herein, an "embedding" is an ordered collection of numeric values that represents an input in a particular embedding space. For example, an embedding may be a vector of floating point or other numeric values that has a fixed dimensionality.

In one or more embodiments, because the required understanding is only for "textual" data (e.g., the text in custom data, a user's query text, etc.) and this does not involve the correspondence between the textual data and images, the infrastructure node (120) may implement a single modality embedding process (via a single modality (text) embedding transform model (e.g., Google BERT, GloVe, etc.)), represented by a circle including only vertical lines (see FIG. 1.2). Further, during implementation, two text items (processed through the single modality embedding process) may be characterized by cosine similarity to denote semantic proximity between them.

In one or more embodiments, as being a vector database, the semantic text database (136) may store/log/record unstructured and/or structured data that may include (or specify), for example (but not limited to): one or more "text" embedding vectors (e.g., the aforementioned text embedding vectors that generated by the single modality model), information regarding a sender (e.g., a malicious user, a high priority trusted user, a low priority trusted user, etc.) of custom data (that is used to generate one or more text embedding vectors), information regarding the size of custom data (or data packets of the custom data), a cumulative history of user activity records obtained over a prolonged period of time, a cumulative history of network traffic logs obtained over a prolonged period of time, previously received malicious data access/retrieval requests from an invalid user, a backup history documentation of a workload, a version of an application, a product identifier of an application, an index of an asset, recently obtained customer/user information of a user, a restore history documentation of a workload, a documentation that indicates a set of jobs (e.g., an embedding vector indexing job) that has been initiated, an image path associated with a product's image (which may be used to retrieve a reference image from the catalog image store (134)), a documentation that indicates a status of a job (e.g., how many jobs are still active, how many jobs are completed, etc.), a cumulative history of initiated indexing operations over a prolonged period of time, an identifier of a vendor, a profile of an invalid user, a fraud report for an invalid user, one or more outputs of the processes performed by the catalog search module (e.g., 154, FIG. 1.2), etc. Based on the aforementioned data, for example, the semantic text database (136) may perform user analytics to infer profiles of users communicating with the semantic text database (136).

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a set of text embedding vectors is received, an indexing operation is initiated, an ongoing indexing operation is fully completed, etc.

As describe above and similar to the catalog database (132), the semantic text database (136) may also provide an indexing service.

In one or more embodiments, the unstructured and/or structured data (of the semantic text database (136)) may be maintained by, for example, the infrastructure node (120). The infrastructure node may add, remove, and/or modify those data in the semantic text database to cause the information included in the semantic text database to reflect the latest version of, for example, text embedding vectors. The unstructured and/or structured data available in the semantic text database (136) may be implemented using, for example, lists, tables, unstructured data, structured data, etc. While described as being stored locally, the unstructured and/or structured data may be stored remotely, and may be distributed across any number of devices without departing from the scope of the invention.

While the semantic text database (136) has been illustrated and described as including a limited number and type of data, the catalog image store may store additional, less, and/or different data without departing from the scope of the invention. In the embodiments described above, the semantic text database (136) is demonstrated as a remote entity; however, embodiments herein are not limited as such. In one or more embodiments, the semantic text database (136) may be a local entity to clients (e.g., 110A, 110B, etc.) or to the infrastructure node (120).

One of ordinary skill will appreciate that the semantic text database (136) may perform other functionalities without departing from the scope of the invention. The semantic text database (136) may be implemented using hardware, software, or any combination thereof.

In one or more embodiments, the retrieval image store (138) may provide long-term, durable, high read/write throughput data storage/protection with near-infinite scale and low-cost. The retrieval image store (138) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the retrieval image store (138) may also occupy a portion of a physical storage/memory device or, alternatively, may span across multiple physical storage/memory devices.

In one or more embodiments, the retrieval image store (138) may be implemented using physical devices that provide data storage services (e.g., storing data and providing copies of previously stored data). The devices that provide data storage services may include hardware devices and/or logical devices. For example, the retrieval image store (138) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the retrieval image store (138) may include a memory device (e.g., a dual in-line memory device), in which data is stored and from which copies of previously stored data are provided. As yet another example, the retrieval image store (138) may include a persistent storage device (e.g., an SSD), in which data is stored and from which copies of previously stored data is provided. As yet another example, the retrieval image store (138) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the retrieval image store (138) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, as being a file, object, or streaming storage device, the retrieval image store (138) may store/log/record unstructured and/or structured data that may include (or specify), for example (but not limited to): raw images (e.g., camera images) (or raw/field data representing the data that users want to search from (e.g., a user may send "please return me all the moments Number 100 screws are captured on the assembly line" as a search query)), sensor data (described above), information regarding objects in a scene (described above), historical raw data and its corresponding details, information regarding the size of raw data (or data packets of the raw data), a cumulative history of network traffic logs obtained over a prolonged period of time, previously received malicious data access/retrieval requests from an invalid user, a backup history documentation of a workload, a version of an application, a product identifier of an application, an index of an asset, recently obtained customer/user information of a user, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the semantic image database (140), one or more attributes (e.g., features, objects, contents, etc.) associated with one or more video data streams, an aspect of an entity/object (e.g., a vehicle, a person, etc.), one or more context clues (e.g., identifiers of events, an identifier of an entity, data and time information of an accident at a scene, etc.), a license plate number of a vehicle (captured by a surveillance camera) in a particular period of time, a color/coloring of a vehicle, one or more points-in-time and/or one or more periods of time associated with an event, information about a scene, an average number of vehicles in a period of time, a number of blue vehicles in a scene, a color of an entity/object, a type of an entity, a number of each type of entity, one or more static objects characteristics (e.g., information (extracted from sensor data) representative of static objects (e.g., non-transitory) in a scene such as a number of each type of static object in the scene, relative positioning and/or orientation of static objects with respect to other static objects in the scene, etc.), one or more dynamic objects characteristics (e.g., information (extracted from sensor data) representative of dynamic objects (e.g., transitory) in a scene such as a number of each type of dynamic object in the scene, relative positioning and/or orientation of dynamic objects with respect to other static objects in the scene, statistical information (e.g., average, mean, standard of deviation, etc.) regarding any of the aforementioned types of information, etc.), a number of persons that are traveling on a walkway, information regarding an object of interest in a scene at one or more points-in-time and/or over one or more periods of time, an identifier of a sensor, an inferred bounding box regarding an object in a video data stream, information with respect to a person's face, a product identifier of a client (e.g., 110A), a type of a client, historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details, a completion timestamp encoding a date and/or time reflective of the successful completion of a job, a time duration reflecting the length of time expended for executing and completing a job, a backup retention period associated with a feature, a number of errors encountered when handling a job, etc. Based on the aforementioned data, for example, the retrieval image store (138) may perform user analytics to infer profiles of users communicating with the retrieval image store (138).

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of camera images is received, a data restore operation is initiated, an ongoing data backup operation is fully completed, etc.

In one or more embodiments, similar to the catalog database (132), the retrieval image store (138) may also provide an indexing service.

In one or more embodiments, the unstructured and/or structured data (of the retrieval image store (138)) may be maintained by, for example, the infrastructure node (120). The infrastructure node may add, remove, and/or modify those data in the catalog image store to cause the information included in the catalog image store to reflect the latest version of, for example, product information. The unstructured and/or structured data available in the retrieval image store (138) may be implemented using, for example, lists, tables, unstructured data, structured data, etc. While described as being stored locally, the unstructured and/or structured data may be stored remotely, and may be distributed across any number of devices without departing from the scope of the invention.

While the retrieval image store (138) has been illustrated and described as including a limited number and type of data, the catalog image store may store additional, less, and/or different data without departing from the scope of the invention. In the embodiments described above, the retrieval image store (138) is demonstrated as a remote entity; however, embodiments herein are not limited as such. In one or more embodiments, the retrieval image store (138) may be a local entity to clients (e.g., 110A, 110B, etc.) or to the infrastructure node (120).

One of ordinary skill will appreciate that the retrieval image store (138) may perform other functionalities without departing from the scope of the invention. The retrieval image store (138) may be implemented using hardware, software, or any combination thereof.

In one or more embodiments, the semantic image database (140) may provide long-term, durable, high read/write throughput data storage/protection with near-infinite scale and low-cost. The semantic image database (140) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the semantic image database (140) may also occupy a portion of a physical storage/memory device or, alternatively, may span across multiple physical storage/memory devices.

In one or more embodiments, the semantic image database (140) may be implemented using physical devices that provide data storage services (e.g., storing data and providing copies of previously stored data). The devices that provide data storage services may include hardware devices and/or logical devices. For example, the semantic image database (140) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the semantic image database (140) may include a memory device (e.g., a dual in-line memory device), in which data is stored and from which copies of previously stored data are provided. As yet another example, the semantic image database (140) may include a persistent storage device (e.g., an SSD), in which data is stored and from which copies of previously stored data is provided. As yet another example, the semantic image database (140) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the semantic image database (140) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the agent of the infrastructure node (120) may implement a multimodal model (or a multimodal (text, image) embedding transform model, see FIG. 1.2) to transform at least a portion of data (e.g., raw data such as field data, sensor data, etc.) stored in the retrieval image store (138) into one or more "image" embedding vectors (said another way, the multimodal model (e.g., CLIP, represented by a circle including vertical and horizontal lines (see FIG. 1.2)) is used to perform an image embedding process on the raw data). To this end, (i) the raw data is made semantically searchable, (ii) users are enabled to find images (of objects) through a semantic matching process, (iii) the raw data is semantically indexed for search purposes (e.g., to optimize queries executed by a user, to allow the user to efficiently search for specific data items for a better user experience, to provide powerful data search (and/or retrieval) capabilities to corresponding entities, etc.), and (iv) one or more image embedding vectors (that are generated from the raw data) is stored in the semantic image database (140), for example, to optimize an ANN search/query performed by an image by image module (e.g., 162, FIG. 1.2) or an image by text module (e.g., 164, FIG. 1.2).

In one or more embodiments, as being a vector database, the semantic image database (140) may store/log/record unstructured and/or structured data that may include (or specify), for example (but not limited to): one or more "image" embedding vectors (e.g., the aforementioned image embedding vectors that generated by the multimodal model), information regarding a sender (e.g., any type of sensor such as a visual sensor, a temperature sensor, a humidity sensors, etc.) of raw data (that is used to generate one or more image embedding vectors), information regarding the size of the raw data (or data packets of the raw data), a cumulative history of user activity records obtained over a prolonged period of time, a cumulative history of network traffic logs obtained over a prolonged period of time, previously received malicious data access/retrieval requests from an invalid user, a backup history documentation of a workload, a version of an application, a product identifier of an application, an index of an asset, recently obtained customer/user information of a user, a restore history documentation of a workload, a documentation that indicates a set of jobs (e.g., an embedding vector indexing job) that has been initiated, an image path associated with a product's image (which may be used to retrieve the most relevant image from the retrieval image store (138)), a documentation that indicates a status of a job (e.g., how many jobs are still active, how many jobs are completed, etc.), a cumulative history of initiated indexing operations over a prolonged period of time, an identifier of a vendor, a profile of an invalid user, a fraud report for an invalid user, one or more outputs of the processes performed by the image by image module (e.g., 162, FIG. 1.2) or the image by text module (e.g., 164, FIG. 1.2), etc. Based on the aforementioned data, for example, the semantic image database (140) may perform user analytics to infer profiles of users communicating with the semantic image database (140).

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a set of image embedding vectors is received, an indexing operation is initiated, an ongoing indexing operation is fully completed, etc.

As describe above and similar to the catalog database (132), the semantic image database (140) may also provide an indexing service.

In one or more embodiments, the unstructured and/or structured data (of the semantic image database (140)) may be maintained by, for example, the infrastructure node (120). The infrastructure node may add, remove, and/or modify those data in the semantic text database to cause the information included in the semantic text database to reflect the latest version of, for example, image embedding vectors. The unstructured and/or structured data available in the semantic image database (140) may be implemented using, for example, lists, tables, unstructured data, structured data, etc. While described as being stored locally, the unstructured and/or structured data may be stored remotely, and may be distributed across any number of devices without departing from the scope of the invention.

While the semantic image database (140) has been illustrated and described as including a limited number and type of data, the catalog image store may store additional, less, and/or different data without departing from the scope of the invention. In the embodiments described above, the semantic image database (140) is demonstrated as a remote entity; however, embodiments herein are not limited as such. In one or more embodiments, the semantic image database (140) may be a local entity to clients (e.g., 110A, 110B, etc.) or to the infrastructure node (120).

In the embodiments of the present disclosure, the semantic text database (136) and the semantic image database (140) are demonstrated as separate entities; however, embodiments herein are not limited as such. The semantic text database (136) and the semantic image database (140) may be combined into a single vector database, including at least text embedding vectors and image embedding vectors (and their corresponding indexes).

In one or more embodiments, the embedding vectors stored in the semantic text database (136) and the semantic image database (140) may need to be re-organized to build a newer index or update an existing index based on (a) the features/objects identified by a newer image retrieval query/job or (b) an another object that a user requests to obtain/infer from existing raw data (e.g., an existing video data stream that is obtained from a camera). For example, apart from the images of "Model 100" screws, a user may want to retrieve images of "Model ABV" chairs within a specific scene using the same video stream data at a later point-in-time.

One of ordinary skill will appreciate that the semantic image database (140) may perform other functionalities without departing from the scope of the invention. The semantic image database (140) may be implemented using hardware, software, or any combination thereof.

As discussed above, embodiments described herein are, at least, applicable to the catalog database (132), the catalog image store (134), and the retrieval image store (138) that need to serve an application and/or a user performing a data item search (or a content-aware data search) using, for example, an interface (e.g., 150, FIG. 1.2).

While FIG. 1.1 shows a configuration of components, other system configurations may be used without departing from the scope of the invention.

Turning now to FIG. 1.2, FIG. 1.2 shows components of the infrastructure node (120) (and other relevant components of the system (100)) in accordance with one or more embodiments of the invention. The infrastructure node (120) includes an intention recognition module (152), the catalog search module (154), an image embedding generation module (156), a query text embedding generation module (155), and a similarity search engine (160). The infrastructure node (120) may include additional, fewer, and/or different components without departing from the scope of the invention. Separately, the similarity search engine (160) includes the image by image module (162), an analyzer (166), the image by text module (164), and an image access module (168). Each component may be operably connected to any of the other component via any combination of wired and/or wireless connections. Each component illustrated in FIG. 1.2 (apart from the components discussed above in reference to FIG. 1.1) is discussed below.

While the infrastructure node (120) has been illustrated and described as including a limited number of specific components, the infrastructure node (120) may include additional, fewer, and/or different components than those mentioned above without departing from the scope of the invention.

To provide any quantity and any type of computer-implemented services/functionalities, the intention recognition module (152), the catalog search module (154), the image embedding generation module (156), the query text embedding generation module (155), and the similarity search engine (160) may utilize computing resources provided by various hardware components and/or logical components (e.g., virtualization resources) of the infrastructure node (120). In one or more embodiments, a computing resource (e.g., a measurable quantity of a compute-relevant resource type that may be requested, allocated, and/or consumed) may be (or may include), for example (but not limited to): a CPU, a GPU, a DPU, a memory resource, a network resource, storage space/source (e.g., to store any type and quantity of information), storage input/output (I/O), a hardware resource set, a compute resource set (e.g., one or more processors, processor dedicated memory, etc.), a control resource set, etc.

In one or more embodiments, computing resources of the infrastructure node (120) may be divided into three logical resource sets (e.g., a compute resource set, a control resource set, and a hardware resource set that may be implemented as separate physical devices). By logically dividing the computing resources of the infrastructure node (120) into these resource sets, different quantities and types of computing resources may be allocated to the intention recognition module (152), the catalog search module (154), the image embedding generation module (156), the query text embedding generation module (155), and the similarity search engine (160).

Dividing the computing resources in accordance with the three set model may enable different resource sets to be differentiated (e.g., given different personalities) to provide different functionalities. Further, different resource sets, or portions thereof, from the same or different infrastructure nodes may be aggregated to support the intention recognition module (152), the catalog search module (154), the image embedding generation module (156), the query text embedding generation module (155), and the similarity search engine (160) having at least one resource set from each set of the three resource set model. Consequently, the intention recognition module (152), the catalog search module (154), the image embedding generation module (156), the query text embedding generation module (155), and the similarity search engine (160) may be supported on the basis of desired functionalities rather than just on the basis of aggregate resources to be included in these physical and/or logical components.

As described above, to support, for example, the catalog search module (154), the infrastructure node (120) may include at least three resource sets including a control resource set. The control resource set may include a processor, in which the processor may mediate presentation of computing resources provided by the hardware resources (of the infrastructure node (120)) to a compute resource set (e.g., as bare metal resources). When doing so, the processor may provide a layer of abstraction that enables the hardware resources to be, for example, virtualized, emulated as being compatible with other systems, and/or directly connected to the compute resource set (e.g., pass through). Consequently, the computing resources of the hardware resources may be finely, or at a macro level, allocated to the catalog search module (154).

In one or more embodiments, the control resource set may facilitate operation of, for example, the catalog search module (154). To do so, the control resource set may prepare any quantity of computing resources from any number of hardware resource sets (e.g., of corresponding infrastructure nodes) for presentation. Once prepared, the control resource set may present the prepared computing resources as bare metal resources to a composer (not shown) of the infrastructure node (120). By doing so, the catalog search module (154) may be supported/instantiated.

To prepare the computing resources of the hardware resource sets for presentation, the control resource set may employ, for example, virtualization, indirection, abstraction, and/or emulation. These management functionalities may be transparent to components/applications hosted by the infrastructure node (120). Consequently, while unknown to components of the infrastructure node (120), for example, the catalog search module (154) may operate in accordance with any number of management models.

In one or more embodiments, information associated with a hardware resource set (e.g., including at least resource related parameters) may specify, for example (but not limited to): a configurable CPU option (e.g., a valid/legitimate vCPU count per infrastructure node component), a configurable network resource option (e.g., enabling/disabling single-root input/output virtualization (SR-IOV) for a specific infrastructure node component), a configurable memory option (e.g., maximum and minimum memory per infrastructure node component), a configurable GPU option (e.g., allowable scheduling policy and/or virtual GPU (vGPU) count combinations per infrastructure node component), a configurable DPU option (e.g., legitimacy of disabling inter-integrated circuit (I2C) for various infrastructure node components), a configurable storage space option (e.g., a list of disk cloning technologies across one or more infrastructure node components), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a wake on LAN support configuration (e.g., supported/enabled, not supported/disabled, etc.), a type of a vGPU scheduling policy (e.g., a "fixed share" vGPU scheduling policy), a storage mode configuration (e.g., an enabled high-performance storage array mode), etc.

In the embodiments of the present disclosure, the intention recognition module (152), the catalog search module (154), the image embedding generation module (156), the query text embedding generation module (155), and the similarity search engine (160) are demonstrated as part of the infrastructure node (120); however, embodiments herein are not limited as such. The intention recognition module, the catalog search module, the image embedding generation module, the query text embedding generation module, and the similarity search engine may be demonstrated as separate entities from the infrastructure node.

Separately, in the embodiments of the present disclosure, the user interface (150) is demonstrated as a separate entity from the infrastructure node (120); however, embodiments herein are not limited as such. The infrastructure node may host the user interface.

Turning now to the user interface (150) (or an API, a GUI, a programmatic interface, a communication channel, etc.), the user interface (150) may include functionality to, e.g.: (i) obtain/receive data (e.g., any type and/or quantity of input, a data search query, a text query about an object, etc.) from any source (e.g., a user via a client (e.g., 110A, FIG. 1.1)) (and, if necessary, aggregate the data); (ii) based on (i) and by employing a set of linear, non-linear, and/or ML models, analyze, for example, a query to derive additional data; (iii) based on (i) and (ii), send/provide the data and additional data to the intention recognition module (152) for further processing (e.g., to retrieve requested information by the user); (iv) receive original images (and/or original video frames that include queried features/objects and/or relevant sensor data insights) from the image access module (168) for the (received) user's request/query in (i); (v) based on (iv), initiate displaying of the original images (and/or the original video frames) to the user in response to the user's query; (vi) by employing a set of linear, non-linear, and/or ML models, analyze information regarding a user (e.g., a high priority trusted user, a low priority trusted user, a malicious user, etc.) related to a query; (vii) store mappings between an incoming request/call/network traffic and an outgoing request/call/network traffic (from the infrastructure node (120)) in a mapping table; (viii) store in a storage device (a) a cumulative history of user activity records obtained over a prolonged period of time, (b) a cumulative history of network traffic logs obtained over a prolonged period of time, (c) previously received malicious data access/retrieval requests from an invalid user, and/or (d) recently obtained customer/user information (e.g., records, credentials, etc.) of a user; (ix) encompass hardware and/or software components and functionalities provided by the infrastructure node (120) to operate as a service over the network (130); (x) employ a set of subroutine definitions, protocols, and/or hardware/software components for enabling/facilitating communications between the user interface (150) and external entities (e.g., the clients) such that the external entities may perform data item search and/or retrieval (with minimum amount of latency (e.g., with high-throughput and sub-ms latency)); (xi) employ a set of subroutine definitions, protocols, and/or hardware/software components to make text and/or image data (e.g., a video content/frame (that includes one or more features) of a video data stream) searchable by users; and/or (xii) receive a reference image from the custom search module (154) to obtain a confirmation from a corresponding user (e.g., the user can confirm through the user interface (150) which object is the desired to be searched, indicated by the dotted double sided arrow).

One of ordinary skill will appreciate that the user interface (150) may perform other functionalities without departing from the scope of the invention. The user interface (150) may be implemented using hardware, software, or any combination thereof.

In one or more embodiments, the intention recognition module (152) may include functionality to, e.g.: (i) obtain/receive a user's query from the user interface (150); (ii) by employing a set of linear, non-linear, and/or ML models, analyze the user's query to infer/identify the user's intention; (iii) based on (ii), make a determination about whether or not (a) the user's intention is searching an object's image (or an object) in the semantic text database (136) (or indirectly in the catalog database (132) and the catalog image store (134)), (b) the user's intention is not searching for the object's image in the semantic text database (136) (or the user wants to perform the search indirectly in the retrieval image store (138)), or (c) the user's intention does not specify a preference; (iv) based on (iii), act as a preliminary decision point to handle different use cases (e.g., depending on the use case, the intention recognition module may bypass a branch (an upper branch or a lower branch, described below) in the framework), for example, (a) if the user's intention is to search for an object that is defined in the custom data/knowledge (e.g., in the catalog database (132) and the catalog image store (134)), the intention recognition module may bypass the lower branch for further processing, (b) if the user's intention is to search for an object in a general way and to explicitly avoid performing the search in the custom data/knowledge, the intention recognition module may bypass the upper branch for further processing, and (c) if the user's intention does not specify a preference, the intention recognition module may consider both the upper and lower branches for further processing; and/or (v) based on (iv), send the user's query to the catalog search module (154) and/or to the query text embedding generation module (155).

As used herein, the "upper branch" represents a user's query processing path (including, at least, the catalog search module (154) and the image embedding generation module (156)) that needs to be followed in certain scenarios, in which (a) in one scenario, the user may want to search for an object that is defined in the custom data/knowledge (e.g., in the catalog database (132) and the catalog image store (134)) or (b) in another scenario, the user may not specify a preference (in the query).

As used herein, the "lower branch" represents a user's query processing path (including, at least, the query text embedding generation module (155)) that needs to be followed in certain scenarios, in which (a) in one scenario, the user may want to search for an object that in a general way (e.g., a general search query), without performing the search in the custom data/knowledge (e.g., in the catalog database (132) and the catalog image store (134)) or (b) in another scenario, the user may not specify a preference (in the query).

In one or more embodiments, the intention recognition module (152) may be implemented using different approaches (for a better user experience). For example, the intention recognition module (152) may be implemented via a "confirmation through the user interface (150) interaction" approach. This approach may involve suggesting users (of the user interface (150)) to interact with a single-choice option (e.g., a radio button). In this manner, a user may explicitly select whether he/she wants to search for an object (a) in the custom data/knowledge (e.g., in the catalog database (132) and the catalog image store (134)) and along the upper branch, or (b) not in the custom data/knowledge and not along the upper branch (e.g., to perform a general search query). If the user is uncertain, this approach may consider both branches for further processing. In one or more embodiments, while this approach is straightforward, this approach (i) may require additional input from a corresponding user and (ii) may require educating the user with respect to the details of the approach.

As yet another example, the intention recognition module (152) may be implemented via a "confirmation through a rule-based chatbot" approach. This approach may operate based on predefined query templates (e.g., "custom", "product catalog", "search for [object] from my custom knowledge base", etc.), in which these query templates serve as "rules input" to the chatbot. When there is match between a user's query and one of the query templates, the user's intention is considered expressed.

As yet another example, the intention recognition module (152) may be implemented via a "confirmation through a natural language processing (NLP) based chatbot" approach. This approach may operate based on solving a classification problem (e.g., classifying a corresponding user's intention into a specific category such as "search in custom knowledge" (which is related to the upper branch) and "search in general knowledge" (which is related to the lower branch)). Further, in this approach, a labeled data set with annotated user queries (e.g., indicating a custom knowledge based search (using, at least, the catalog database (132) and the catalog image store (134)) or a general knowledge based search (using, at least, the retrieval image store (138))) may be generated. Using the labelled data set, a suitable classification model (e.g., an NLP model, a Support Vector Machines model, a neural network model, etc.) may be trained and validated. Thereafter, upon receiving a user's query, this model may analyze the query and categorize the user's intention.

As yet another example, the intention recognition module (152) may be implemented via a "confirmation through a large language model (LLM) based chatbot" approach. This approach may effortlessly handle a user intention recognition task by zero-shot learning or by introducing specific instructions in a given prompt. This approach may also be useful in use cases where the user interface (150) already host an LLM-based chatbot to address other tasks. In such cases, the intention recognition module (152) may easily achieve its purpose by generating a specific prompt or adding instructions to an existing prompt without affecting the overall operation of the framework.

One of ordinary skill will appreciate that the intention recognition module (152) may perform other functionalities without departing from the scope of the invention. The intention recognition module (152) may be implemented using hardware, software, or any combination thereof.

In one or more embodiments, as being part of the upper branch, the catalog search module (154) may include functionality to, e.g.: (i) as a result of the determination (with respect to a user's intention) made by the intention recognition module (152), receive/obtain a user's query from the intention recognition module (152); (ii) by employing the single modality embedding transform model (represented by a circle including only vertical lines), transform the query into a text embedding vector; (iii) based on the query and using the text embedding vector, communicate with the semantic text database (136) to perform an ANN search for the most matching object in the semantic text database; (iv) based on (iii), identify an image path (or an object path) that is associated with the query; (v) based on the object path, fetch/retrieve a reference image (e.g., the image (of the object) that the user intends to use for searching in field/raw data stored in the retrieval image store (138)) from the catalog image store (134); (vi) based on (v), send the reference image to the user interface (150) to obtain a confirmation from the user with respect to the reference image; and/or (vii) upon obtaining the confirmation, send the reference image to the image embedding generation module (156) for further processing.

One of ordinary skill will appreciate that the catalog search module (154) may perform other functionalities without departing from the scope of the invention. The catalog search module (154) may be implemented using hardware, software, or any combination thereof.

In one or more embodiments, as being part of the upper branch (where the search task/process is transitioned from "searching for an image by the query (or by the query text)" to "searching for an image by the reference image"), the image embedding generation module (156) may include functionality to, e.g.: (i) receive/obtain the reference image from the catalog search module (154); (ii) by employing the multimodal embedding transform model (represented by a circle including vertical and horizontal lines), transform the reference image into an image embedding vector (for comparison purposes); and/or (iii) send the image embedding vector to the image by image module (162) for further processing.

In one or more embodiments, in order to expedite the search process, the image embedding generation module (156) may communicate with the catalog image store (134) and transform reference images (stored in the catalog image store (134)) into one or more image embedding vectors beforehand (and store them). In this manner, depending on the received reference image, the image embedding generation module (156) may quickly find a corresponding image embedding vector (without performing the transforming step again).

One of ordinary skill will appreciate that the image embedding generation module (156) may perform other functionalities without departing from the scope of the invention. The image embedding generation module (156) may be implemented using hardware, software, or any combination thereof.

As indicated, the search request (or the user's query text) from the upper branch leads to the image by image module (162) (where the "reference" image fetched from the catalog image store (134), according to the user's query text, is used as the reference to search a similar image in the retrieval image store (138)). In one or more embodiments, the image by image module (162) may include functionality to, e.g.: (i) receive/obtain an image embedding vector from the image embedding generation module (156); (ii) using the image embedding vector, communicate with the semantic image database (140) to perform an ANN search for a nearest image to the reference image in the semantic image database (e.g., if the reference image is "Model 100" screw, the search result may include the corresponding screws that look like "Model 100" screw from the retrieval image store (138)); (iii) based on (ii), identify an image path (or an object path) that is associated with the nearest image; and/or (iv) send the image path to the analyzer (166) for further processing.

One of ordinary skill will appreciate that the image by image module (162) may perform other functionalities without departing from the scope of the invention. The image by image module (162) may be implemented using hardware, software, or any combination thereof.

In one or more embodiments, as being part of the lower branch, the query text embedding module (155) may include functionality to, e.g.: (i) as a result of the determination (with respect to a user's intention) made by the intention recognition module (152), receive/obtain a user's query from the intention recognition module (152); (ii) by employing the multimodal embedding transform model, transform the query into a text embedding vector; and/or (iii) send the text embedding vector to the image by text module (164) for further processing.

One of ordinary skill will appreciate that the query text embedding module (155) may perform other functionalities without departing from the scope of the invention. The query text embedding module (155) may be implemented using hardware, software, or any combination thereof.

As indicated, the search request (or the user's query text) from the lower branch leads to the image by text module (164), in which the lower branch only relies on general knowledge (without considering "user-specific" custom data/knowledge. In one or more embodiments, the image by text module (164) may include functionality to, e.g.: (i) receive/obtain a text embedding vector from the query text embedding generation module (155); (ii) using the text embedding vector, communicate with the semantic image database (140) to perform an ANN search for a nearest image in the semantic image database (e.g., the text embedding vector is employed to search the semantic image database to identify its ANN counterparts); (iii) based on (ii), identify an image path (or an object path) that is associated with the nearest image; and/or (iv) send the image path to the analyzer (166) for further processing.

One of ordinary skill will appreciate that the image by text module (164) may perform other functionalities without departing from the scope of the invention. The image by text module (164) may be implemented using hardware, software, or any combination thereof.

In one or more embodiments, the analyzer (166) may include functionality to, e.g.: (i) receive/obtain a first object path and a first semantic similarity score (associated with a nearest image) from the image by image module (162); (ii) receive/obtain a second object path and a second semantic similarity score (associated with a nearest image) from the image by text module (164); (iii) based on (i)-(ii), compare the first semantic similarity score against the second semantic similarity score (e.g., the analyzer plays a key role by comparing the results of both searches and generating the final output through one or more specific strategies (discussed below)); (iv) based on (iii), make a first determination as to whether or not the first semantic similarity score is greater than or equal to the second semantic similarity score; (v) based on the first determination, send the first object path to the image access module (168) for further processing; (vi) based on the first determination, make a second determination as to whether or not the second semantic similarity score is greater than or equal to a predetermined similarity score; (vii) based on the second determination, send the second object path to the image access module (168) for further processing; and/or (viii) based on the second determination, send the first and second object paths to the image access module (168) for further processing.

In one or more embodiments, the analyzer (166) may employ, at least, (i) a "preemptive mode" strategy, (ii) a "collaborative mode" strategy, and (iii) a "full return mode" strategy (for a better data retrieval experience). In the "preemptive mode" strategy (e.g., a "custom knowledge prioritization" strategy), if the catalog search module (154) (of the upper branch) returns a highly positive result (or a high confidence result) with respect to a match in the custom data (e.g., in the case where the user did not specify a preference in the user's query and "Model 100" screw is a high confidence match (e.g., an exact match) in the custom data), this strategy may block the lower branch's search results (potentially interrupting the lower branch's search process earlier to reduce to overall resource utilization within the infrastructure node (120)) and only return results from the upper branch.

Specifically, by evaluating the cosine similarity result (between the user's query and a corresponding object in the custom data) obtained from the catalog search module (154), if the similarity is high (and exceeds a customized threshold), this means that the user's query has already found a corresponding object in the custom data (e.g., the catalog database (132) and the catalog image store (134)) and the preemptive mode can be implemented.

In the "collaborative mode" strategy, if the similarity results from the catalog search module (154) does not exceed the customized threshold, the search results from the upper branch and lower branch may need to be merged (where each branch's search result may return several images along with their similarities to the user's query). To this end, in this strategy, (i) these images may be ranked based on their similarities and, for example, the top three images may become the output for further processing, or (ii) a weight may be assigned to each of the ranked similarities and the "weighted and reordered" images may become the output for further processing.

Further, in the "full return mode" strategy, no preemptive branch blocking/filtering occurs and the search results from the upper branch and lower branch are directly provided to the user interface (150), in which the user is informed about each result. Comparing to the other strategies, the "full return mode" strategy provides more control to the user; however, the user may need to be trained/educated more with respect to this strategy's details.

One of ordinary skill will appreciate that the analyzer (166) may perform other functionalities without departing from the scope of the invention. The analyzer (166) may be implemented using hardware, software, or any combination thereof.

In one or more embodiments, the image access module (168) may include functionality to, e.g.: (i) receive/obtain one or more object paths from the analyzer (166); (ii) based on a corresponding object path, fetch/retrieve a "raw" image from the retrieval image store (138) (e.g., the image access module may directly identify the corresponding raw/field image that semantically matches the user's query from a multimodal perspective); and/or (iii) based on (ii), send the raw image to the user interface (150) (where the user interface initiates displaying of the image to a corresponding user in response to the user's query).

One of ordinary skill will appreciate that the image access module (168) may perform other functionalities without departing from the scope of the invention. The image access module (168) may be implemented using hardware, software, or any combination thereof.

In one or more embodiments, the components shown in FIG. 1.2 may be utilized in isolation and/or in combination to provide the above-discussed functionalities. These functionalities may be invoked using any communication model including, for example, message passing, state sharing, memory sharing, etc.

While FIG. 1.2 shows a configuration of components, other system configurations may be used without departing from the scope of the invention.

Turning now to FIG. 2.1, FIG. 2.1 shows example knowledge stored in the catalog database (e.g., 132, FIG. 1.1) in accordance with one or more embodiments of the invention. As indicated, the example knowledge may be stored in a JavaScript Object Notation (JSON) format. Assume here that the example knowledge specifies, at least: (a) (i) "Product Name: No. 100 Screw", (ii) "Material: Stainless Steel", (iii) "Shape: T-Shaped", (iv) "Surface Treatment: Zinc Plating", (v) "Size: Standard Size (Customizable)", (vi) "Usage Description: Suitable for woodworking and metal engineering. Provides strong connection and support", and (vi) "Image Path: abc//my-bucket-name/path/X/images/100.jpg" (where the actual image file is stored in the catalog image store (e.g., 134, FIG. 1.1)); (b) (i) "Product Name: No. 200 Screw", (ii) "Material: Alloy Steel", (iii) "Shape: L-Shaped", (iv) "Surface Treatment: Phosphating", (v) "Size: Various sizes available", (vi) "Usage Description: Used in building structures and mechanical equipment. Provides high tensile strength and corrosion resistance", and (vi) "Image Path: abc//my-bucket-name/path/X/images/200.jpg" (where the actual image file is stored in the catalog image store); and (c) (i) "Product Name: No. 300 Screw", (ii) "Material: Copper Alloy", (iii) "Shape: Hexagonal Head", (iv) "Surface Treatment: Nickel Plating", (v) "Size: Medium Size (Customizable)", (vi) "Usage Description: Used for electronic devices and furniture assembly. Provides reliable electrical connection and decorative features", and (vi) "Image Path: abc//my-bucket-name/path/X/images/300.jpg" (where the actual image file is stored in the catalog image store).

Turning now to FIG. 2.2, FIG. 2.2 shows example knowledge stored in the catalog database (e.g., 132, FIG. 1.1) in accordance with one or more embodiments of the invention. As indicated, the example knowledge may be stored as a data schema in the catalog database. Assume here that the example knowledge specifies, at least: "CREATE TABLE ProductCatalog ((i) ProductID: INT PRIMARY KEY, (ii) ProductName VARCHAR (255), (iii) Material VARCHAR (255), (iv) Shape VARCHAR (255), (v) SurfaceTreatment VARCHAR (255), (vi) Size VARCHAR (255), (vii) Usage-Description TEXT, and (viii) ImagePath VARCHAR (255)".

FIGS. 3.1-3.8 show a method for managing an image retrieval framework (e.g., an image retrieval solution that employs pretrained single modality and multimodal embedding transform models) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed user interface (e.g., 150, FIG. 1.2), intention recognition module (e.g., 152, FIG. 1.2), and catalog search module (e.g., 154, FIG. 1.2). Other components of the system (100) illustrated in FIG. 1.1 may also execute all or part of the method shown in FIG. 3.1 without departing from the scope of the invention.

In Step 300, the user interface (e.g., a GUI) receives a query (or a query text as input) about an object (e.g., for searching the object's image) from a requesting entity (e.g., a user/customer of Client A (e.g., 110A, FIG. 1.1), an administrator terminal, an application, etc.), in which the query (e.g., what is the color of "Model 100" screw?) may include/specify information with respect to the object (e.g., an identifier of the object, an identifier of the user who initiated the query, an identifier of a client used by the user, etc.).

In Step 302, in response to receiving the query, as part of that query, and/or in any other manner (e.g., before initiating any computation with respect to the query), the user interface sends the query to the intention recognition module.

In Step 304, (i) upon receiving the query (including the information provided with the query) and (ii) by employing a set of linear, non-linear, and/or ML models, the intention recognition module proactively analyzes the query to infer the user's intention (e.g., for a better user experience, for not second-guessing which branch should be selected for further processing, etc.).

In Step 306, based on Step 304, the intention recognition module makes a first determination (in real-time or near real-time) as to whether the user's intention is searching the object (or the object's image) in the semantic text database (e.g., 136, FIG. 1.1) (or indirectly in the catalog database (e.g., 132, FIG. 1.1) and the catalog image store (e.g., 134, FIG. 1.1)). Accordingly, in one or more embodiments, if the result of the first determination is YES (indicating that the user's intention is to search for the object in the custom knowledge base (where, for example, the query may specify "search for "Model 100 T-shaped"screw from my custom knowledge base"), the method proceeds to Step 308 (where the method bypasses the lower branch (see FIG. 1.2)). If the result of the determination is NO, the method alternatively proceeds to Step 314.

In Step 308, as a result of the first determination in Step 306 being YES, the intention recognition module sends the query (received in Step 300) to the catalog search module. In Step 310, by employing the single modality embedding transform model (see FIG. 1.2), the catalog search module transforms the query into a text embedding vector. In Step 312, based on the query and using the text embedding vector, the catalog search module communicates with the semantic text database (or invokes the semantic text database) to perform an ANN search for the most matching/relevant object (or the most matching object vector) in the semantic text database (to allow for the image search and/or retrieval).

In Step 314, as a result of the first determination in Step 306 being NO, the intention recognition module makes a second determination (in real-time or near real-time) as to whether the user's intention is "not" searching the object (or the object's image) in the semantic text database (or "not" indirectly in the catalog database and the catalog image store). Accordingly, in one or more embodiments, if the result of the second determination is YES (indicating that (i) the user wants to perform the search indirectly in the retrieval image store (e.g., 138, FIG. 1.1) and/or (ii) the user wants to search for the object in a general way (e.g., by explicitly avoid performing the search in the custom knowledge base; by searching "T-shaped" screws, not "Model 100 T-shaped" screws; etc.)), the method proceeds to Step 342 of FIG. 3.4 (where the method bypasses the upper branch (see FIG. 1.2)). If the result of the second determination is NO (indicating that the user's intention does not specify a preference), the method alternatively proceeds to Step 362 of FIG. 3.5 (where the method considers both the upper and lower branches).

In one or more embodiments, if the result of the second determination is NO, the framework may implement/execute both branches as parallel processes. For example, as a parallel process (with minimum amount of latency), any set of upper branch or lower branch components may be instantiated and execute tasks at any given time. Each successful completion of the tasks may be tracked until the specified number of successful completions is reached, where at that point, the parallel processing of the tasks officially complete and terminate.

Turning now to FIG. 3.2, the method shown in FIG. 3.2 may be executed by, for example, the above-discussed catalog search module, image embedding generation module (e.g., 156, FIG. 1.2), and image by image module (e.g., 162, FIG. 1.2). Other components of the system (100) illustrated in FIG. 1.1 may also execute all or part of the method shown in FIG. 3.2 without departing from the scope of the invention.

In Step 316, as a result of the search performed in Step 312 of FIG. 3.1, the catalog search module identifies an object path (e.g., an image path (see FIG. 2.1), a file path, a key, etc.) that is associated with the query (received in Step 300 of FIG. 3.1). In Step 318, based on the object path, the catalog search module fetches a reference image (e.g., the image (of the object) that the user intends to use for searching in field data stored in the retrieval image store) from the catalog image store. In Step 320, the catalog search module sends the reference image to the user interface to obtain a confirmation from the user with respect to the reference image (see the dotted double sided arrow in FIG. 1.2).

In Step 322, upon obtaining the confirmation (where the confirmation indicates that the reference image is the correct/proper (or the most relevant) image that the user wants to search), the catalog search module sends the reference image to the image embedding generation module. In Step 324, by employing the multimodal embedding transform model (see FIG. 1.2), the image embedding generation module transforms the reference image into an image embedding vector. In Step 326, the image embedding generation module sends the image embedding vector to the image by image module.

In Step 328, using the image embedding vector, the image by image module communicates with the semantic image database (e.g., 140, FIG. 1.1) (or invokes the semantic image database) to perform an ANN search for a nearest image to the reference image in the semantic image database. In Step 330, as a result of the search performed in Step 328, the image by image module identifies a second object path (e.g., an image path, a file path, a key, etc.) that is associated with the nearest image.

Turning now to FIG. 3.3, the method shown in FIG. 3.3 may be executed by, for example, the above-discussed catalog search module image by image module, analyzer (e.g., 166, FIG. 1.2), image access module (e.g., 168, FIG. 1.2), and user interface. Other components of the system (100) illustrated in FIG. 1.1 may also execute all or part of the method shown in FIG. 3.3 without departing from the scope of the invention.

In Step 332, the image by image module sends the second object path to the analyzer. In Step 334, the analyzer sends the second object path to the image access module. In Step 336, based on the second object path, the image access module fetches a "raw" image from the retrieval image store (e.g., the image access module directly identifies the corresponding raw/field image that semantically matches the user's query from a multimodal perspective). In Step 338, the image access module sends the raw image to the user interface (i.e., the GUI), in which, as indicated, the input to the framework was "text" (Step 300 of FIG. 3.1) and the output from the framework is an "image" (Step 338).

In Step 340, the user interface initiates displaying of the "retrieved" image (or a data item) to the user in response to the user's query (received in Step 300 of FIG. 3.1). In one or more embodiments, the data item (e.g., a thumbnail associated with the query, an actual image of the searched/ queried object, multiple video frames and related sensor data associated with the query, etc.) may be displayed/presented on the user interface or on a GUI of the corresponding client (e.g., 110A, FIG. 1.1), in which the data item may be highlighted so that the user may replay a video (in a video player) related to the query. In one or more embodiments, the method may end following Step 340.

Turning now to FIG. 3.4, the method shown in FIG. 3.4 may be executed by, for example, the above-discussed intention recognition module, query text embedding generation module (e.g., 165, FIG. 1.2), image by text module (e.g., 164, FIG. 1.2), analyzer, image access module, and user interface. Other components of the system (100) illustrated in FIG. 1.1 may also execute all or part of the method shown in FIG. 3.4 without departing from the scope of the invention.

In Step 342, as a result of the second determination in Step 314 of FIG. 3.1 being YES, the intention recognition module sends the query (received in Step 300 of FIG. 3.1) to the query text embedding generation module. In Step 344, by employing the multimodal embedding transform model (see FIG. 1.2), the query text embedding generation module transforms the query into a text embedding vector. In Step 346, the query text embedding generation module sends the text embedding vector to the image by text module.

In Step 348, based on the query and using the text embedding vector, the image by text module communicates with the semantic image database (or invokes the semantic image database) to perform an ANN search for a nearest image (or a nearest relevant object vector associated with the query) in the semantic image database (to allow for the image search and/or retrieval). In Step 350, as a result of the search performed in Step 348, the image by text module identifies an object path (e.g., an image path, a file path, a key, etc.) that is associated with the nearest image. In Step 352, the image by text module sends the object path to the analyzer. In Step 354, the analyzer sends the object path to the image access module.

In Step 356, based on the object path, the image access module fetches a "raw" image from the retrieval image store (e.g., the image access module may directly identify the corresponding raw/field image that semantically matches the user's query from a multimodal perspective). In Step 358, the image access module sends the raw image to the user interface (i.e., the GUI), in which, as indicated, the input to the framework was "text" (Step 300 of FIG. 3.1) and the output from the framework is an "image" (Step 358).

In Step 360, the user interface initiates displaying of the "retrieved" image (or a data item) to the user in response to the user's query (received in Step 300 of FIG. 3.1). In one or more embodiments, the data item (e.g., a thumbnail associated with the query, an actual image of the searched/ queried object, multiple video frames and related sensor data associated with the query, etc.) may be displayed/presented on the user interface or on a GUI of the corresponding client, in which the data item may be highlighted so that the user may replay a video (in a video player) related to the query. In one or more embodiments, the method may end following Step 360.

Turning now to FIG. 3.5, the method shown in FIG. 3.5 may be executed by, for example, the above-discussed intention recognition module, query text embedding generation module, catalog search module, and image embedding generation module. Other components of the system (100) illustrated in FIG. 1.1 may also execute all or part of the method shown in FIG. 3.5 without departing from the scope of the invention.

In Step 362, as a result of the second determination in Step 314 of FIG. 3.1 being NO, the intention recognition module sends the query (received in Step 300 of FIG. 3.1) to the catalog search module. In Step 364, as a result of the second determination in Step 314 of FIG. 3.1 being NO, the intention recognition module sends the query (received in Step 300 of FIG. 3.1) to the query text embedding generation module.

In Step 365, by employing the single modality embedding transform model (see FIG. 1.2), the catalog search module transforms the query into a text embedding vector. In Step 366, based on the query and using the text embedding vector, the catalog search module communicates with the semantic text database (or invokes the semantic text database) to perform an ANN search for the most matching/ relevant object (or the most matching object vector) in the semantic text database (to allow for the image search and/or retrieval).

In Step 367, as a result of the search performed in Step 366, the catalog search module identifies an object path (e.g., an image path, a file path, a key, etc.) that is associated with the query (received in Step 300 of FIG. 3.1). In Step 368, based on the object path, the catalog search module fetches a reference image (e.g., the image (of the object) that the user intends to use for searching in field data stored in the retrieval image store) from the catalog image store. In Step 369, the catalog search module sends the reference image to the user interface to obtain a confirmation from the user with respect to the reference image (see the dotted double sided arrow in FIG. 1.2).

In Step 370, upon obtaining the confirmation (where the confirmation indicates that the reference image is the correct/proper (or the most relevant) image that the user wants to search), the catalog search module sends the reference image to the image embedding generation module. In Step 371, by employing the multimodal embedding transform model (see FIG. 1.2), the image embedding generation module transforms the reference image into an image embedding vector (e.g., a second embedding vector).

Turning now to FIG. 3.6, the method shown in FIG. 3.6 may be executed by, for example, the above-discussed image embedding generation module, image by image module, query text embedding generation module, and image by text module. Other components of the system (100) illustrated in FIG. 1.1 may also execute all or part of the method shown in FIG. 3.6 without departing from the scope of the invention.

In Step 372, the image embedding generation module sends the image embedding vector to the image by image module. In Step 373, using the image embedding vector (obtained in Step 371 of FIG. 3.5), the image by image module communicates with the semantic image database (or invokes the semantic image database) to perform an ANN search for a nearest image to the reference image in the semantic image database.

In Step 374, as a result of the search performed in Step 373, the image by image module identifies (i) a second object path (e.g., an image path, a file path, a key, etc.) and (ii) (by employing a linear, non-linear, and/or ML model) a first semantic similarity score that are associated with the nearest image. In Step 375, the image by image module sends the second object path and first semantic similarity score to the analyzer.

Further, in Step 376, by employing the multimodal embedding transform model (see FIG. 1.2), the query text embedding generation module transforms the query into a text embedding vector (e.g., a third embedding vector). In Step 377, the query text embedding generation module sends the third embedding vector to the image by text module. In Step 378, based on the query and using the third embedding vector, the image by text module communicates with the semantic image database (or invokes the semantic image database) to perform an ANN search for a nearest image (or a nearest relevant object vector associated with the query) in the semantic image database (to allow for the image search and/or retrieval). In Step 379, as a result of the search performed in Step 378, the image by text module identifies (i) a third object path (e.g., an image path, a file path, a key, etc.) and (ii) (by employing a linear, non-linear, and/or ML model) a second semantic similarity score that are associated with the nearest image. In Step 380, the image by text module sends the third object path and second semantic similarity score to the analyzer.

Turning now to FIG. 3.7, the method shown in FIG. 3.7 may be executed by, for example, the above-discussed analyzer, image access module, and user interface. Other components of the system (100) illustrated in FIG. 1.1 may also execute all or part of the method shown in FIG. 3.7 without departing from the scope of the invention.

In Step 381, by employing a set of linear, non-linear, and/or ML models, the analyzer compares the first semantic similarity score against the second semantic similarity score (in order to determine which object path contains the image (or the most matching/relevant image) of the queried object (in Step 300 of FIG. 3.1)).

In one or more embodiments, the first semantic similarity score can be compared to the second semantic similarity score because the same multimodal embedding transform model is used for embedding extraction of both images and text. The multimodal embedding transform model projects both types of data (whether text or images) into the same joint embedding space, in which the distance between text and an image is determined via semantic similarity.

In Step 382, based on Step 381, the analyzer makes a third determination (in real-time or near real-time) as to whether the first semantic similarity score is greater than or equal to a predetermined similarity score/threshold. Accordingly, in one or more embodiments, if the result of the third determination is YES (indicating that a high confidence search is performed), the method proceeds to Step 383. If the result of the determination is NO, the method alternatively proceeds to Step 387.

In Step 383, as a result of the third determination in Step 382 being YES, the analyzer sends the second object path (identified in Step 374 of FIG. 3.6) to the image access module. In Step 384, based on the second object path, the image access module fetches a "raw" image from the retrieval image store (e.g., the image access module may directly identify the corresponding raw/field image that semantically matches the user's query from a multimodal perspective). In Step 385, the image access module sends the raw image to the user interface (i.e., the GUI), in which, as indicated, the input to the framework was "text" (Step 300 of FIG. 3.1) and the output from the framework is an "image" (Step 385).

In Step 386, the user interface initiates displaying of the "retrieved" image (or a data item) to the user in response to the user's query (received in Step 300 of FIG. 3.1). In one or more embodiments, the data item (e.g., a thumbnail associated with the query, an actual image of the searched/queried object, multiple video frames and related sensor data associated with the query, etc.) may be displayed/presented on the user interface or on a GUI of the corresponding client, in which the data item may be highlighted so that the user may replay a video (in a video player) related to the query. In one or more embodiments, the method may end following Step 386.

In Step 387, as a result of the third determination in Step 382 being NO, the analyzer makes a fourth determination (in real-time or near real-time) as to whether the second semantic similarity score is greater than or equal to the predetermined similarity score/threshold. Accordingly, in one or more embodiments, if the result of the fourth determination is YES (indicating that a high confidence search is performed), the method proceeds to Step 388. If the result of the determination is NO, the method alternatively proceeds to Step 392 of FIG. 3.8.

In Step 388, as a result of the fourth determination in Step 387 being YES, the analyzer sends the third object path (identified in Step 379 of FIG. 3.6) to the image access module. In Step 389, based on the third object path, the image access module fetches a "raw" image from the retrieval image store (e.g., the image access module directly identifies the corresponding raw/field image that semantically matches the user's query from a multimodal perspective).

In Step 390, the image access module sends the raw image to the user interface (i.e., the GUI), in which, as indicated, the input to the framework was "text" (Step 300 of FIG. 3.1)

and the output from the framework is an "image" (Step 390). In Step 391, the user interface initiates displaying of the "retrieved" image (or a data item) to the user in response to the user's query (received in Step 300 of FIG. 3.1). In one or more embodiments, the data item (e.g., a thumbnail associated with the query, an actual image of the searched/queried object, multiple video frames and related sensor data associated with the query, etc.) may be displayed/presented on the user interface or on a GUI of the corresponding client, in which the data item may be highlighted so that the user may replay a video (in a video player) related to the query. In one or more embodiments, the method may end following Step 391.

Turning now to FIG. 3.8, the method shown in FIG. 3.8 may be executed by, for example, the above-discussed analyzer, image access module, and user interface. Other components of the system (100) illustrated in FIG. 1.1 may also execute all or part of the method shown in FIG. 3.8 without departing from the scope of the invention.

In Step 392, as a result of the fourth determination in Step 387 being NO, the analyzer sends the second and third object paths to the image access module. In Step 393, based on the second and third object paths, the image access module fetches a first "raw" image (that is associated with the second object path) and a second "raw" image (that is associated with the third object path) from the retrieval image store.

In Step 394, the image access module sends the first and second raw images to the user interface (i.e., the GUI), in which, as indicated, the input to the framework was "text" (Step 300 of FIG. 3.1) and the output from the framework are "images" (Step 394).

In Step 395, the user interface initiates displaying of the "retrieved" images (or data items) to the user in response to the user's query (received in Step 300 of FIG. 3.1). In one or more embodiments, a data item (e.g., a thumbnail associated with the query, an actual image of the searched/queried object, multiple video frames and related sensor data associated with the query, etc.) may be displayed/presented on the user interface or on a GUI of the corresponding client, in which the data item may be highlighted so that the user may replay a video (in a video player) related to the query.

In one or more embodiments, the images may be displayed in an ordered manner (e.g., in an ascending or descending order with different colors) based on their semantic similarity scores (where red color tones may represent lower semantic similarity scores and green color tones may represent higher semantic similarity scores). While displaying the images, one or more useful insights/suggestions with respect to the images may also be displayed (for example, in a separate window(s) on the GUI) to the user in order to assist the user while selecting the correct image (e.g., for a better user experience, to help the user with respect to understanding the benefits and trade-offs of selecting an image towards making a decision, etc.).

In one or more embodiments, the method may end following Step 395.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an image retrieval framework, the method comprising:
  receiving, by a graphical user interface (GUI), a query about an object from a user, wherein the GUI sends the query to an intention recognition module (IRM);
  analyzing, by the IRM, the query to infer intention of the user;
  in response to the analyzing, making, by the IRM, a determination that the intention is searching for the object in a semantic text database, wherein, based on the determination, the IRM sends the query to a catalog search module (CSM);
  transforming, by the CSM and via a single modality embedding transform model (SMETM), the query into a first embedding vector;

performing, by the CSM and using the first embedding vector, a search for a most matching object in a semantic text database;

identifying, by the CSM and in response to the search, a path associated with the query;

fetching, by the CSM and based on the path, a reference image (RI) from a catalog image store, wherein the RI is sent to the GUI to obtain a confirmation from the user;

sending, by the CSM and after obtaining the confirmation, the RI to an image embedding generation module (IEGM);

transforming, by the IEGM and via a multimodal embedding transform model (METM), the RI into a second embedding vector, wherein the IEGM sends the second embedding vector to an image by image module (IIM);

performing, by the IIM and using the second embedding vector, a second search for a nearest image to the RI in a semantic image database;

identifying, by the IIM and in response to the second search, a second path associated with the nearest image, wherein the IIM sends the second path to an analyzer, wherein the analyzer further sends the second path to an image access module (IAM);

fetching, by the IAM and based on the second path, an image from a retrieval image store, wherein the IAM sends the image to the GUI; and initiating, by the GUI, displaying of the image to the user in response to the query.

2. The method of claim 1, wherein the catalog image store comprises at least user provided domain custom information, wherein the user provides the domain custom information via a physical object catalog or an electronic object catalog, wherein the electronic object catalog specifies at least a correspondence between the query and the image.

3. The method of claim 2, wherein the single modality embedding transform model is employed to generate text embedding vectors on a text portion of the catalog image store, wherein the text embedding vectors are stored along with corresponding image paths in the semantic text database.

4. The method of claim 2, wherein the first embedding vector is a text embedding vector.

5. The method of claim 1, wherein the second embedding vector is an image embedding vector.

6. The method of claim 1, wherein the query specifies searching for the object in the catalog image store.

7. The method of claim 1, wherein the search is an approximate nearest neighbor search, the second search is a second approximate nearest neighbor search.

8. The method of claim 1, wherein the SMETM is a pre-trained model that does not require fine-tuning.

9. The method of claim 1, wherein the METM is a pre-trained model that does not require fine-tuning.

10. A method for managing an image retrieval framework, the method comprising:
receiving, by a graphical user interface (GUI), a query about an object from a user, wherein the GUI sends the query to an intention recognition module (IRM);
analyzing, by the IRM, the query to infer intention of the user;
in response to the analyzing, making, by the IRM, a first determination that the intention is not searching for the object in a semantic text database, wherein the first determination is verified by making a second determination;
sending, by the IRM and based on the second determination, the query to a query text embedding generation module (QTEGM);
transforming, by the QTEGM and via a multimodal embedding transform model (METM), the query into an embedding vector, wherein the QTEGM sends the embedding vector to an image by text module (ITM);
performing, by the ITM and using the embedding vector, a search for a nearest image in a semantic image database;
identifying, by the ITM and in response to the search, a path associated with the nearest image, wherein the ITM sends the path to an analyzer, wherein the analyzer further sends the path to an image access module (IAM);
fetching, by the IAM and based on the path, an image from a retrieval image store, wherein the IAM sends the image to the GUI; and
initiating, by the GUI, displaying of the image to the user in response to the query.

11. The method of claim 10, wherein the semantic image database stores at least image embedding vectors along with corresponding image paths.

12. The method of claim 10, wherein the embedding vector is an image embedding vector.

13. The method of claim 10, wherein the query specifies not searching for the object in a catalog image store.

14. The method of claim 13, wherein the catalog image store comprises at least user provided domain custom information, wherein the user provides the domain custom information via a physical object catalog or an electronic object catalog.

15. The method of claim 10, wherein the search is an approximate nearest neighbor search.

16. The method of claim 10, wherein the METM is a pre-trained model that does not require fine-tuning.

17. A method for managing an image retrieval framework, the method comprising:
receiving, by a graphical user interface (GUI), a query about an object from a user, wherein the GUI sends the query to an intention recognition module (IRM);
analyzing, by the IRM, the query to infer intention of the user;
in response to the analyzing, making, by the IRM, a first determination that the intention does not specify a preference, wherein the first determination is verified by making a second determination;
sending, by the IRM and based on the second determination, the query to a catalog search module (CSM) and to a query text embedding generation module (QTEGM);
transforming, by the CSM and via a single modality embedding transform model (SMETM), the query into a first embedding vector;
performing, by the CSM and using the first embedding vector, a search for a most matching object in a semantic text database;
identifying, by the CSM and in response to the search, a path associated with the query;
fetching, by the CSM and based on the path, a reference image (RI) from a catalog image store, wherein the CSM sends the RI to an image embedding generation module (IEGM);
transforming, by the IEGM and via a multimodal embedding transform model (METM), the RI into a second embedding vector, wherein the IEGM sends the second embedding vector to an image by image module (IIM);

performing, by the IIM and using the second embedding vector, a second search for a nearest image to the RI in a semantic image database;

identifying, by the IIM and in response to the second search, a second path associated with the nearest image and a first similarity score (SS) associated with the nearest image, wherein the IIM sends the second path and the first SS to an analyzer;

transforming, by the QTEGM and via a multimodal embedding transform model (METM), the query into a third embedding vector, wherein the QTEGM sends the third embedding vector to an image by text module (ITM);

performing, by the ITM and using the third embedding vector, a third search for a second nearest image in the semantic image database;

identifying, by the ITM and in response to the third search, a third path associated with the second nearest image and a second SS associated with the second nearest image, wherein the ITM sends the third path and the second SS to the analyzer;

comparing, by the analyzer, the first SS against the second SS;

in response to the comparing, by the analyzer, making a third determination that the first SS is greater than or equal to a predetermined SS;

sending, by the analyzer and based on the third determination, the second path to an image access module (IAM);

fetching, by the IAM and based on the second path, an image from a retrieval image store, wherein the IAM sends the image to the GUI; and initiating, by the GUI, displaying of the image to the user in response to the query.

18. The method of claim 17, wherein the catalog image store comprises at least user provided domain custom information, wherein the user provides the domain custom information via a physical object catalog or an electronic object catalog.

19. The method of claim 17, wherein the SMETM is a pre-trained model that does not require fine-tuning.

20. The method of claim 17, wherein the METM is a pre-trained model that does not require fine-tuning.

* * * * *